US008664796B2

(12) United States Patent
Nielsen

(10) Patent No.: US 8,664,796 B2
(45) Date of Patent: Mar. 4, 2014

(54) 3-PHASE HIGH POWER UPS

(75) Inventor: Henning Roar Nielsen, Brenderup (DK)

(73) Assignee: Schneider Electric II Corporation, West Kingston, RI (US)

( * ) Notice: Subject to any disclaimer, the term of this patent is extended or adjusted under 35 U.S.C. 154(b) by 0 days.

(21) Appl. No.: 13/616,482

(22) Filed: Sep. 14, 2012

(65) Prior Publication Data

US 2013/0076152 A1 Mar. 28, 2013

Related U.S. Application Data

(62) Division of application No. 13/192,869, filed on Jul. 28, 2011, now Pat. No. 8,344,551, which is a division of application No. 12/713,927, filed on Feb. 26, 2010, now Pat. No. 8,008,809, which is a division of application No. 11/677,303, filed on Feb. 21, 2007, now Pat. No. 7,688,048.

(51) Int. Cl.
*H02J 1/12* (2006.01)

(52) U.S. Cl.
USPC .......................................................... 307/46

(58) Field of Classification Search
USPC .......................................................... 307/46
See application file for complete search history.

(56) References Cited

U.S. PATENT DOCUMENTS

| 4,065,711 | A | 12/1977 | Kawabata |
| 4,114,048 | A | 9/1978 | Hull et al. |
| 4,564,747 | A | 1/1986 | Offermann |
| 4,665,322 | A | 5/1987 | Eishima et al. |
| 5,017,800 | A | 5/1991 | Divan |
| 5,477,091 | A | 12/1995 | Fiorina et al. |
| 5,644,483 | A | 7/1997 | Peng et al. |
| 5,684,686 | A | 11/1997 | Reddy |
| 6,031,738 | A | 2/2000 | Lipo et al. |
| 6,069,412 | A | 5/2000 | Raddi et al. |
| 6,184,593 | B1 | 2/2001 | Jungreis |
| 6,437,996 | B1 | 8/2002 | Wobben |

(Continued)

FOREIGN PATENT DOCUMENTS

| CN | 1476139A A | 2/2004 |
| JP | 2000-511398 A | 8/2000 |

(Continued)

OTHER PUBLICATIONS

EP Communication dated Jan. 18, 2011 from corresponding EP Application No. 08 730 212.1-2207.

(Continued)

*Primary Examiner* — Daniel Cavallari
(74) *Attorney, Agent, or Firm* — Lando & Anastasi, LLP

(57) ABSTRACT

According to one aspect, embodiments of the invention provide a UPS comprising a plurality of electrical buses, a first AC/DC converter coupled to the electrical buses and configured to convert a first input AC voltage to a plurality of DC voltages, a second AC/DC converter coupled to the electrical buses and configured to convert a second input AC voltage to the plurality of DC voltages, a third AC/DC converter coupled to the electrical buses and configured to convert a third input AC voltage to the plurality of DC voltages, a first DC/AC converter configured to convert the plurality of DC voltages into a first output AC voltage, and a DC bus balancer configured to maintain voltages present on the electrical buses by transferring energy between the plurality of electrical buses.

20 Claims, 13 Drawing Sheets

(56) References Cited

U.S. PATENT DOCUMENTS

| | | |
|---|---|---|
| 6,459,596 B1 | 10/2002 | Corzine |
| 6,631,080 B2 | 10/2003 | Trimble et al. |
| 6,661,678 B2 | 12/2003 | Raddi et al. |
| 6,757,185 B2 | 6/2004 | Rojas Romero |
| 6,903,537 B2 | 6/2005 | Tzeng et al. |
| 7,106,607 B2 | 9/2006 | Nielsen |
| 7,352,083 B2 | 4/2008 | Nielsen et al. |
| 7,639,520 B1 | 12/2009 | Zansky et al. |
| 7,688,048 B2 | 3/2010 | Nielsen |
| 7,964,990 B2 * | 6/2011 | Yamada et al. ............... 307/45 |
| 8,008,809 B2 | 8/2011 | Nielsen |
| 8,344,551 B2 | 1/2013 | Nielsen |
| 8,385,091 B2 | 2/2013 | Nielsen |
| 2001/0033502 A1 | 10/2001 | Blair et al. |
| 2002/0126518 A1 | 9/2002 | Lazarovich |
| 2002/0133728 A1 | 9/2002 | Agarwal |
| 2003/0076696 A1 | 4/2003 | Tsai |
| 2004/0084967 A1 | 5/2004 | Nielsen |
| 2004/0155526 A1 | 8/2004 | Naden et al. |
| 2004/0160210 A1 | 8/2004 | Bohne et al. |
| 2005/0024016 A1 | 2/2005 | Breen et al. |
| 2005/0036248 A1 | 2/2005 | Klikic et al. |
| 2005/0162019 A1 | 7/2005 | Masciarelli et al. |
| 2005/0168073 A1 | 8/2005 | Hjort |
| 2005/0201127 A1 | 9/2005 | Tracy et al. |
| 2006/0043792 A1 | 3/2006 | Hjort et al. |
| 2006/0238941 A1 | 10/2006 | Ingemi et al. |
| 2007/0064363 A1 | 3/2007 | Nielsen et al. |
| 2007/0228837 A1 | 10/2007 | Nielsen et al. |
| 2008/0061628 A1 | 3/2008 | Nielsen et al. |
| 2008/0197706 A1 | 8/2008 | Nielsen |
| 2008/0252145 A1 | 10/2008 | Urakabe et al. |
| 2008/0253156 A1 | 10/2008 | Urakabe et al. |
| 2009/0261793 A1 | 10/2009 | Urakabe et al. |
| 2011/0280055 A1 | 11/2011 | Nielsen |

FOREIGN PATENT DOCUMENTS

| | | |
|---|---|---|
| JP | 2000-324711 A | 11/2000 |
| JP | 2006-109620 A | 4/2006 |
| WO | 97/44877 | 11/1997 |
| WO | 9744877 A1 | 11/1997 |
| WO | 01/65659 A2 | 9/2001 |
| WO | 2003032464 A1 | 4/2003 |
| WO | 2005/101634 A1 | 10/2005 |
| WO | 2006/026549 A2 | 3/2006 |

OTHER PUBLICATIONS

Grzesiak et al., DC Link Balancing Method in Back-To-Back UPS System With Mulit-Level Converters, IEEE ISIE 2006, pp. 908-913, Jul. 9-12, 2006, Montreal, Quebec, Canada.

International Search Report for PCT/US2008/054365 mailed Oct. 31, 2008.

Introduction to Power Supplies, National Semiconductor, Application Note 556, 2002 National Semiconductor Corporation, www.national.com, pp. 1-7(Sep. 2002).

Sinha, Gl Lipo, T.A.; Afour-level inverter based drive iwh a passive front end,: Power Electronics, IEEE Transactions on, vol. 15, No. 2, pp. 285-294, Mar. 2000.

Annette von Jouanne et al., "A Multilevel Inverter Approach Providing DC-Link Balancing, Ride-Through Enhancement, and Common-Mode Voltage Elimination", IEEE Transactions on Industrial Electrnics, IEEE Service Center, Piscataway, NJ, USA, vol. 49, No. 1, Aug. 1, 2002, XP011073754, ISSN: 0278-0046.

Extended European Search Report from corresponding European Application No. 13152794.7 dated Jun. 6, 2013.

EP Communication dated Jan. 18, 2011 from EP Application No. 08 730 212.1-2207.

Grzesiak and Tomasik; "DC Link Balancing Method in Back-to-Back UPS System with Multi-Level Converters", IEEE ISIE 2006, Jul. 9-12, 2006, Montreal, Quebec, Canada.

International Search Report for PCT/US2010/045587 mailed Feb. 3, 2011.

\* cited by examiner

State 1

State 2

State 3

State 1

State 2

State 3

3-PHASE HIGH POWER UPS

RELATED APPLICATIONS

This application is a divisional of U.S. patent application Ser. No. 13/192,869, filed Jul. 28, 2011, which is a divisional of U.S. patent application Ser. No. 12/713,927, filed Feb. 26, 2010 (now U.S. Pat. No. 8,008,809), and which is a divisional of U.S. patent application Ser. No. 11/677,303, filed Feb. 21, 2007 (now U.S. Pat. No. 7,688,048), all of which are hereby incorporated herein by reference.

BACKGROUND OF INVENTION

Uninterruptible power supplies (UPSs) including voltage converters are fundamental parts of many electrical systems such as power supply systems for computers and servers in data centers. UPSs can be used with many typical power systems including single and 3-phase connections, and can be used with low-power systems (e.g., a household computer) and high-power systems (e.g., large data centers or process facilities). High-power systems typically use a 3-phase power connection (e.g., X, Y, and Z phases). A 3-phase UPS voltage converter is typically used to provide 3-phase AC power to a 3-phase load, to convert a 3-phase AC voltage from one level to another, and to provide 3-phase power to a load in the event of a power failure. The input and output connections to a 3-phase UPS voltage converter are typically three- or four-terminal connections, one connection for each phase of the 3-phase power connection and an optional neutral connection. A battery is also typically coupled to the UPS voltage converter and is used to store energy for use in case of a power failure.

Typical high power (e.g., above 100 kW) UPSs are operated using nominal AC input voltages of 3×400 V (in Europe) or 3×480 V (in the U.S.). Transformerless UPSs may operate with an internal DC bus voltage of ±450 V. In such a configuration, components contained in the UPS are preferably rated for at least 1200 V operation due to large voltage overshoots associated with stray inductances of physically large insulated gate bipolar transistor (IGBT) modules. The use of 1200 V components, however, typically leads to increased conduction and switching losses, thus lowering the efficiency.

SUMMARY OF INVENTION

In general, in an aspect, the invention provides a UPS including a plurality of electrical buses, a first AC/DC converter coupled to the electrical buses and configured to receive a first input AC voltage and to convert the first input AC voltage to a plurality of DC voltages, the first AC/DC converter being configured to convey the plurality of DC voltages to the plurality of electrical buses, a second AC/DC converter coupled to the electrical buses and configured to receive a second input AC voltage and to convert the second input AC voltage to the plurality of DC voltages, the second AC/DC converter being configured to convey the plurality of DC voltages to the plurality of electrical buses, a third AC/DC converter coupled to the electrical buses and configured to receive a third input AC voltage and to convert the third input AC voltage to the plurality of DC voltages, the third AC/DC converter being configured to convey the plurality of DC voltages to the plurality of electrical buses, a DC/DC converter coupled to the plurality of electrical buses and configured to, convert the plurality of DC voltages to a battery DC voltage, and convert the battery DC voltage to the plurality of DC voltages, a first DC/AC converter coupled to the plurality of electrical buses and configured to receive the plurality of DC voltages and to convert the plurality of DC voltages into a first output AC voltage, and a DC bus balancer configured to maintain voltages present on the electrical buses at desired levels, the DC bus balancer being configured to transfer energy between the plurality of electrical buses, wherein the first, second, and third AC/DC converters are configured such that the first, second, and third AC/DC converters convey the plurality of DC voltages to the plurality of electrical buses when the first, second, and third input AC voltages are within a predetermined threshold, wherein the DC/DC converter is configured such that the DC/DC converter conveys the plurality of DC voltages to the plurality of the electrical buses when the first, second, and third input AC voltages are not within the predetermined threshold.

Embodiments of the invention may provide one or more of the following features. The UPS further includes a second DC/AC converter coupled to the plurality of electrical buses and configured to receive the plurality of DC voltages and to convert the plurality of DC voltages into a second output AC voltage, and a third DC/AC converter coupled to the plurality of electrical buses and configured to receive the plurality of DC voltages and to convert the plurality of DC voltages into a third output AC voltage. The first, second, and third DC/AC converters are configured to convey 3-phase power to a load. The DC/DC converter is configured to convert the plurality of DC voltages to the battery DC voltage when the first, second, and third input AC voltages are within a predetermined range, and the DC/DC converter is configured to convert the battery DC voltage to the plurality of DC voltages when the first, second, and third input AC voltages are not within the predetermined range. A battery is coupled to the DC/DC converter and is configured to receive and be charged by the battery DC voltage, and convey the battery DC voltage to the DC/DC converter. The first AC/DC converter is coupled to a first phase of a 3-phase power source, the second AC/DC converter is coupled to a second phase of a 3-phase power source, and the third AC/DC converter is coupled to a third phase of a 3-phase power source.

In general, in another aspect, the invention provides an AC/DC converter including an input configured to receive an AC power signal having a positive peak voltage and a negative peak voltage, first, second, third, and fourth outputs, an inductor coupled to the input, first and second switches coupled in series between the inductor and the first output, the first switch being coupled to the inductor, a third switch coupled to the junction of the first and second switches and the second output, fourth and fifth switches coupled in series between the inductor and the fourth output, the fourth switch being coupled to the inductor, a sixth switch coupled to the junction of the fourth and fifth switches and the third output, a first diode coupled in parallel with the first switch, a second diode coupled in parallel with the second switch, a third diode coupled in parallel with the third switch, a fourth diode coupled in parallel with the fourth switch, a fifth diode coupled in parallel with the fifth switch, and a sixth diode coupled in parallel with the sixth switch.

Embodiments of the invention may further provide one or more of the following features. The AC/DC converter further includes a controller coupled to the first, second, third, fourth, fifth, and sixth switches. The controller is configured to toggle the first, second, third, fourth, fifth, and sixth switches such that a first output DC voltage is conveyed to the first output, a second output DC voltage is conveyed to the second output, a third output DC voltage is conveyed to the third output, and a fourth output DC voltage is conveyed to the fourth output.

The first output DC voltage is equal to or greater than the positive peak input voltage multiplied by $$\frac{\sqrt{2}}{\sqrt{3}},$$

the second output DC voltage is substantially equal to one-third of the first output DC voltage, the third output DC voltage is substantially equal to one-third of the fourth output DC voltage, and the fourth output DC voltage is equal to or less than the negative peak input voltage multiplied by $$\frac{\sqrt{2}}{\sqrt{3}}.$$

Embodiments of the invention may further provide one or more of the following features. The controller is further configured to cause, when an instantaneous voltage of the AC power signal is between the first and second output DC voltages, the AC/DC converter to operate in a first state where the first switch is toggled on, the second switch is repeatedly toggled on and off, the third switch is repeatedly toggled on and off, the fourth switch is toggled off, the fifth switch is toggled off, the sixth switch is toggled on, cause, when the instantaneous voltage of the AC power signal is between the second and third output DC voltages, the AC/DC converter to operate in a second state where, the first switch is repeatedly toggled on and off, the second switch toggled off, the third switch is toggled on, the fourth switch is repeatedly toggled on and off, the fifth switch is toggled off, the sixth switch is toggled on, cause, when the instantaneous voltage of the AC power signal is between the third and fourth output DC voltages, the AC/DC converter to operate in a third state where, the first switch is toggled off, the second switch toggled off, the third switch is toggled on, the fourth switch is toggled on, the fifth switch is repeatedly toggled on and off, and the sixth switch is repeatedly toggled on and off. The controller is pulse width modulation (PWM) controller. The PWM controller is configured to use a feedback loop to control the actuation of the first, second, third, fourth, fifth, and sixth switches. The AC/DC converter further includes a capacitor coupled between the input and a neutral. The AC/DC converter further including a first capacitor coupled between the first and second outputs, a second capacitor coupled between the second output and a neutral, a third capacitor coupled between the neutral and the third output, and a fourth capacitor coupled between the third output and the fourth output.

In general, in another aspect, the invention provides a DC/AC converter configured to convey an AC power signal having a positive peak voltage and a negative peak voltage, the DC/AC converter including an output configured to convey the AC power signal, first, second, third, and fourth inputs, each being configured to receive a respective input voltage, a filter coupled to the output, first and second switches coupled in series between the filter and the first input, the first switch being coupled to the filter, a third switch coupled to a junction of the first and second switches and the second input, fourth and fifth switches coupled in series between the filter and the fourth input, the fourth switch being coupled to the filter, a sixth switch coupled to a junction of the fourth and fifth switches and the third input, a first diode coupled in parallel with the first switch, a second diode coupled in parallel with the second switch, a third diode coupled in parallel with the third switch, a fourth diode coupled in parallel with the fourth switch, a fifth diode coupled in parallel with the fifth switch, and a sixth diode coupled in parallel with the sixth switch.

Embodiments of the invention may provide one or more of the following features. The DC/AC converter further includes a controller coupled to the first, second, third, fourth, fifth, and sixth switches. The controller is configured to toggle the first, second, third, fourth, fifth, and sixth switches such that the AC power signal is induced at the output. The controller is configured to toggle the first, second, third, fourth, fifth, and sixth switches such that the positive peak voltage of the output AC power signal is less than the DC voltage conveyed to the first input multiplied by $$\frac{\sqrt{3}}{\sqrt{2}},$$

and
the negative peak voltage of the output AC power signal is greater than the DC voltage conveyed to the fourth input multiplied by $$\frac{\sqrt{3}}{\sqrt{2}}.$$

The controller is configured to cause, when the AC power signal is between the DC voltages conveyed on the first and second inputs, the DC/AC converter to operate in a first state where the first switch is toggled on, the second switch is repeatedly toggled on and off, the third switch is repeatedly toggled on and off, the fourth switch is toggled off, the fifth switch is toggled off, the sixth switch is toggled on, cause, when the AC power signal is between the DC voltages conveyed on the second and third inputs, the DC/AC converter to operate in a second state where the first switch is repeatedly toggled on and off, the second switch toggled off, the third switch is toggled on, the fourth switch is repeatedly toggled on and off, the fifth switch is toggled off, the sixth switch is toggled on, cause, when the AC power signal is between the DC voltages conveyed on the third and fourth inputs, the DC/AC converter to operate in a third state where the first switch is toggled off, the second switch toggled off, the third switch is toggled on, the fourth switch is toggled on, the fifth switch is repeatedly toggled on and off, and the sixth switch is repeatedly toggled on and off.

Embodiments of the invention may further provide one or more of the following features. The filter includes an inductor coupled between the output and the junction of first and fourth switches, and a capacitor coupled between the output and a neutral. The first, second, third, fourth, fifth, and sixth switches are configured to be controlled by a pulse width modulation (PWM) controller. The PWM controller coupled to the output and configured to control the actuation of the first, second, third, fourth, fifth, and sixth switches in accordance with a voltage level of the output. The AC/DC converter further includes a first capacitor coupled between the first and second inputs, a second capacitor coupled between the second input and a neutral, a third capacitor coupled between the neutral and the third input, and a fourth capacitor coupled between the third and fourth inputs.

In general, in another aspect, the invention provides a DC/DC converter for use with a battery, the DC/DC converter including first and second battery nodes configured to be coupled to the battery, first, second, third, and fourth bus nodes, first and second switches coupled in series between the first and second bus nodes wherein the first switch is coupled to the first bus node and the second switch is coupled to the second bus node, a first buck-boost converter coupled to a junction of the first and second switches, to a neutral, and to the first battery node, third and fourth switches coupled in series between the third and fourth bus nodes wherein the third switch is coupled to the third bus node and the fourth switch is coupled to the fourth bus node, and a second buck-boost converter coupled to a junction of the third and fourth switches, to the neutral, and to the second battery node, a first diode coupled across the first switch, a second diode coupled across the second switch, a third diode coupled across the third switch, a fourth diode coupled across the fourth switch, wherein the DC/DC converter is configured to operate in a first state to charge the battery using energy conveyed by at least one of the first, second, third, and fourth bus nodes, and wherein the DC/DC converter is configured to operate in a second state to convey a DC voltage to at least one of the first, second, third, and fourth bus nodes using energy conveyed by the battery.

Embodiments of the invention may provide one or more of the following features. In the first state, the first and second buck-boost converters function as a buck-converter, and in the second state the first and second buck-boost converters function as a boost converter. The first buck-boost converter includes a first inductor coupled to the junction of the first and second switches and to the first battery node, a first capacitor coupled between the first battery node and the neutral, the second buck-boost converter includes a second inductor coupled to the junction of the third and fourth switches and the second battery node, a second capacitor coupled between the second battery node and the neutral. The DC/DC converter further includes a controller coupled to the first, second, third, and fourth switches. The controller is configured to, in the first state repeatedly toggle the first and fourth switches on and off, switch the second and third switches to an off state, in the second state, switch the first and fourth switches to an off state, and repeatedly toggle the second and third switches on and off. The controller is a pulse width modulation (PWM) controller. The controller is configured to use a feedback loop to control the first, second, third, and fourth switches. The DC/DC converter further includes a third battery node coupled to the neutral. The DC/DC converter further includes a first capacitor coupled between the first and second bus nodes, a second capacitor coupled between the second bus node and the neutral, a third capacitor coupled between the neutral node and the third bus node, and a fourth capacitor coupled between the third and fourth bus nodes.

In general, in another aspect, the invention provides a circuit for use with four-level DC power including first, second, third, and fourth voltages, the circuit including first, second, third, and fourth nodes configured to receive the four-level DC power, first, second, third, fourth, fifth, and sixth switches coupled in series between the first and fourth nodes, wherein the second node is coupled to a junction of the second and third switches and the third node is coupled to a junction of the fourth and fifth switches, a first diode coupled in parallel with the first switch, a second diode coupled in parallel with the second switch, a third diode coupled in parallel with the third switch, a fourth diode coupled in parallel with the fourth switch, a fifth diode coupled in parallel with the fifth switch, a sixth diode coupled in parallel with the sixth switch, a first resonant tank coupled to a junction of the first and second switches and to the junction of the third and fourth switches, and a second resonant tank coupled to the junction of the third and fourth switches and to the junction of the fifth and sixth switches, wherein the first and second resonant tanks are configured to shift energy between at least two of the first, second, third, and fourth nodes if an absolute value of the first voltage differs from an absolute value of the fourth voltage, and wherein the first and second resonant tanks are configured to shift energy between at least two of the first, second, third, and fourth nodes if an absolute value of the second voltage differs from an absolute value of the third voltage.

Embodiments of the invention may provide one or more of the following features. The first resonant tank includes a first capacitor coupled in series with a first inductor, and the second resonant tank includes a second capacitor coupled in series with a second inductor. The circuit further includes a controller configured to actuate the first, second, third, fourth, fifth, and sixth switches into respective on and off states. The controller is a pulse width modulation (PWM) controller. The controller is configured to cause the circuit to operate in one of two states, wherein in a first state the first, third, and fifth switches are in the respective on states and the second, fourth, and sixth switches are in their respective off states, and in a second state, the first, third, and fifth switches are in their respective off states and the second, fourth, and sixth switches are actuated in their respective on states. The controller is configured to cause the circuit to repeatedly alternate between the first and the second states at a frequency substantially equal to the resonant frequencies of the first and second resonant tanks. The controller is configured to cause the circuit to repeatedly alternate between the first and second states such that amplitudes of square waves induced at junctions of the second and third switches, the third and fourth switches, and the fifth and sixth switches are substantially equal when the absolute value of the first and fourth voltages are substantially equal and the absolute value of the second and third voltages are substantially equal. The controller is configured to cause the first, second, third, fourth, fifth, and sixth switches to alternate between the first and second states at substantially a fifty percent duty cycle. The circuit further includes a third inductor coupled between the junction of the third and fourth switches and a neutral. The circuit further includes a first capacitor is coupled between the first node and the second node, a second capacitor is coupled between the second node and a neutral, a third capacitor is coupled between the neutral and the third node, and a fourth capacitor is coupled between the third node and the fourth node.

In general, in another aspect, the invention provides an AC/DC converter including an input configured to receive an AC power signal having a positive peak voltage and a negative peak voltage, first, second, third, and fourth outputs, an inductor coupled to the input, a first circuit coupled to the inductor and to the first and second outputs, the first circuit being configured to operate in at least three states, wherein in a first state the first circuit is configured such that the inductor charges, and a first substantially DC voltage is conveyed to the second output, in a second state the first circuit is configured such that the inductor discharges, and a second substantially DC voltage is conveyed to the first output, in a third state the first circuit is configured such that the inductor discharges, and the first substantially DC voltage is conveyed to the second output, a second circuit coupled to the inductor and to the third and fourth outputs, the second circuit being configured to operate in at least three states, wherein in a first state, the second circuit is configured such that the inductor charges, and a third substantially DC voltage is conveyed to the third output, in a second state, the second circuit is configured such that the inductor discharges, and a fourth substantially DC voltage is conveyed to the fourth output, and in a third state, the second circuit is configured such that the inductor charges, and the third substantially DC voltage is conveyed to the third output.

Embodiments of the invention may provide one or more of the following features. An absolute value of the first and fourth substantially DC voltages are substantially equal, and an absolute value of the second and third substantially DC voltages are substantially equal. The first substantially DC voltage is equal to or greater than the positive peak voltage multiplied by $$\frac{\sqrt{2}}{\sqrt{3}},$$

the second substantially DC voltage is substantially equal to one-third of the first substantially DC voltage, the third substantially DC voltage is substantially equal to one-third of the fourth substantially DC voltage, and the fourth substantially DC voltage is substantially equal to or less than the negative peak voltage multiplied by $$\frac{\sqrt{2}}{\sqrt{3}}.$$

The AC/DC converter further includes a controller configured to control which state the first and second circuits operate in. The controller is configured to vary the duty cycle of when the first circuit operates in the first and second states, and vary the duty cycle of when the second circuit operates in the first and second states. The controller is a pulse width modulation (PWM) controller.

Various aspects of the invention may provide one or more of the following capabilities. Reliable 3-phase power can be provided to a load. Physical size of a 3-phase UPS can be reduced compared to prior techniques. Efficiency can be increased compared with prior techniques. A transformerless circuit can be used to convert AC power to DC, DC power to AC, and DC power from a first voltage to a second voltage. IGBT switching losses can be reduced compared to prior techniques. Components having a lower voltage rating can be used when compared with prior techniques. Heat losses can be reduced compared with prior techniques. The desire for flying capacitors and/or clamp diodes can be reduced, when compared with prior techniques. A voltage of a battery used with a UPS can be reduced compared to prior techniques. Unbalanced operation caused by a mismatch of the voltage provided to the input of a 3-phase UPS and the power drawn from the output of the 3-phase UPS can be compensated without using a transformer.

These and other capabilities of the invention, along with the invention itself, will be more fully understood after a review of the following figures, detailed description, and claims.

DETAILED DESCRIPTION

Embodiments of the invention provide techniques for providing an uninterruptible 3-phase power supply to a load. For example, a transformerless 3-phase uninterruptible power supply includes AC/DC converters (e.g., power factor correction modules), DC/AC converters (e.g., inverters), a DC/DC conversion module, multiple DC buses, and a DC bus balancer. The AC/DC converters receive 3-phase AC power (e.g., 3×400 V or 3×480 V phase-phase) from a 3-phase power source and convert the 3-phase power into DC power (e.g., with multiple voltage levels). Each of the AC/DC converters receives one phase of the 3-phase power connection. Under normal operation (e.g., when suitable 3-phase power is received from the 3-phase power source), the DC power present on the DC buses provides power to the DC/AC converters. Furthermore, during normal operation, a DC/DC converter converts the DC power present on the DC buses to a voltage used to charge the battery. During other times (e.g., when the 3-phase power is insufficient or unavailable), DC power is provided to the DC/AC converters from the battery. The DC/AC converters convert the DC power into 3-phase AC power (e.g., each of the DC/AC converters provide a single phase of the 3-phase signal). The voltages received by the AC/DC converters and the voltages provided by the DC/AC converters can be equal or different. During normal operation or otherwise, the DC bus balancer balances the voltages present on the DC buses by shifting energy between the DC buses. Other embodiments are within the scope of the invention.

Figure 1:
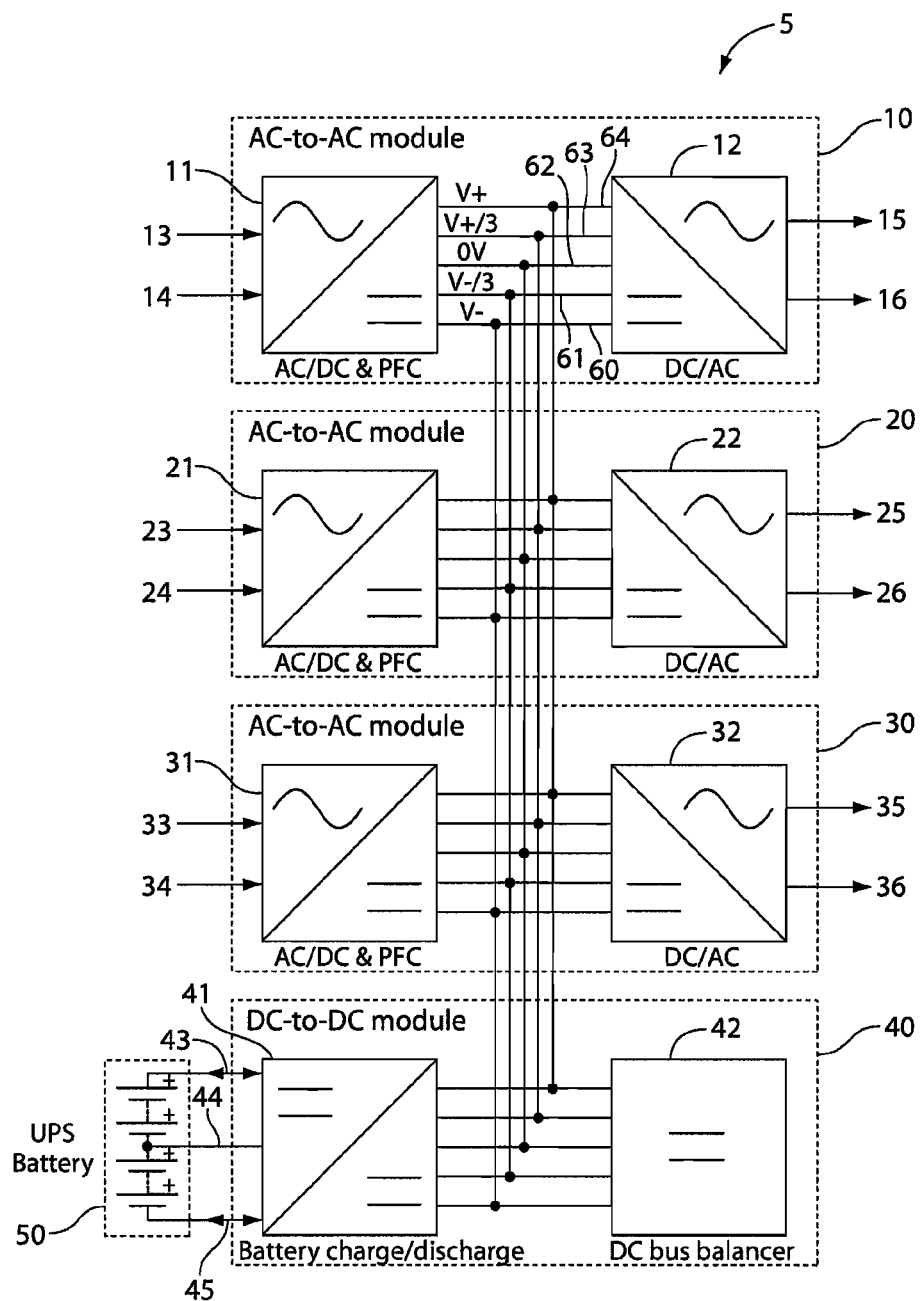
FIG. 1 is a schematic diagram of a 3-phase UPS.

Referring to FIG. 1, a UPS 5 includes AC/AC modules 10, 20, and 30, a DC/DC module 40, a battery 50, and buses 60, 61, 62, 63, and 64. The AC/AC module 10 includes an AC/DC converter 11 coupled to a DC/AC converter 12 via the buses 60, 61, 62, 63, and 64. The AC/AC module 20 includes an AC/DC converter 21 coupled to a DC/AC converter 22 via the buses 60, 61, 62, 63, and 64. The AC/AC module 30 includes an AC/DC converter 31 coupled to a DC/AC converter 32 via the buses 60, 61, 62, 63, and 64. The DC/DC module 40 includes a DC/DC converter 41 and a DC bus balancer 42. The DC/DC converter 41 is coupled to the DC bus balancer 42 via the buses 60, 61, 62, 63, and 64. The AC/AC modules 10, 20, and 30, and the DC/DC module 40 are interconnected via the buses 60, 61, 62, 63, and 64. The UPS 5 is configured to provide power to a load (not shown) from either a 3-phase power feed coupled to the UPS 5 and/or from energy stored in the battery 50.

Each of the AC/AC modules 10, 20, and 30 are configured to receive one phase (e.g., the X, Y, or Z phase) of a 3-phase power feed at a first AC voltage, and to provide a second AC voltage via an output. The AC/DC converter 11 includes inputs 13 and 14; the AC/DC converter 21 includes inputs 23 and 24; and the AC/DC converter 31 includes inputs 33 and 34. The DC/AC converter 12 includes outputs 15 and 16; the DC/AC converter 22 includes outputs 25 and 26; and the DC/AC converter 32 includes outputs 35 and 36. Each of the AC/AC modules 10, 20, and 30 are configured to be coupled to one phase of a 3-phase power feed and to a neutral connection. For example, the input 13 of the AC/DC converter 11 can be coupled to the X phase, the input 23 of the AC/DC converter 21 can be coupled to the Y phase, and the input 33 of the AC/DC converter 31 can be coupled to the Z phase. The inputs 14, 24, and 34 are configured to be coupled to the neutral connection of the 3-phase power feed (or a ground connection). Each of the AC/AC modules 10, 20, and 30 are configured to provide an output including one phase of a 3-phase output, although other configurations are possible. For example, the output 15 can be configured to provide the X phase output, output 25 can be configured to provide the Y phase output, and 35 can be configured to provide the Z phase output. Each of the outputs 16, 26, and 36 are configured to be coupled to a neutral connection of a load. Each of the AC/AC modules 10, 20, and 30 are configured to share power via the buses 60, 61, 62, 63, and 64.

The DC/DC module 40 can receive power from (i.e., when in a charging state) and provide power to (i.e., when in a discharging state) the AC/AC modules 10, 20, and/or 30. The DC/DC converter 41 is configured to be coupled to the battery 50 via connections 43, 44, and 45. The connection 44, however, is optional. The battery 50 is preferably a lead acid battery, although other types of batteries can be used. The DC/DC module 40 is configured to provide DC power to the battery 50 (thereby charging the battery 50) when a desired 3-phase power feed is present at the inputs 13, 23, and 33 (i.e., the charging state). Likewise, the DC/DC module 40 is configured to provide one or more DC voltages, using energy from the battery 50, to the AC/AC modules 10, 20, and 30 in the absence of a desired 3-phase power feed at the inputs 13, 23, and 33 (i.e., the discharging state). The state that the DC/DC module 40 is operating is can be controlled by a controller (not shown) that is configured to monitor, for example, the 3-phase AC input. The DC/DC converter 41 is configured to, in the charging state, receive a DC voltage set from the AC/AC modules 10, 20, and 30 and to convert the DC voltage set to a DC battery-charge voltage desired by the battery 50. The DC/DC converter 41 is further configured to, during the discharging state, receive DC power from the battery 50 at the battery-charge voltage, and to convert it to the DC voltage set. The DC/DC converter 41 is configured to provide the DC voltage set to the AC/AC modules 10, 20, and 30 during the discharging state. The DC/DC converter 41 is coupled to the DC bus balancer 42 via the buses 60, 61, 62, 63, and 64. The DC bus balancer 42 is configured to balance voltages present on the buses 60, 61, 62, 63, and 64, as will be described in more detail below.

The UPS 5 is configured to determine whether or not suitable input power is present on the inputs to the AC/AC modules 10, 20, and/or 30. The UPS 5 can detect the presence of suitable power on the inputs to the AC/AC modules using one or more methods and/or circuitry. For example, the UPS 5 can include circuitry configured to determine whether an AC voltage present on the inputs 13, 23, and/or 33, if any, is at a desired level. The UPS 5 can also include circuitry configured to monitor what state the DC/DC converter 41 is operating in (e.g., the charging or discharging state) and whether a DC voltage is present on the buses 60, 61, 63, and/or 64. For example, if the DC/DC converter 41 is operating in the charging state, and the respective DC voltage on the buses 60, 61, 63, and/or 64 drops below a respective desired level, the circuitry can provide a signal indicating that the AC voltage being provided to the AC/AC converters 11, 21, and 31 has dropped below desired levels. Other methods and/or circuitry can be used to detect if the input AC voltage is below desired levels. The UPS 5 is further configured to disconnect itself from the 3-phase power feed (e.g., by setting switches (as described below) to off positions).

Pulse width modulation (PWM) controllers are configured to control the operation of at least some of the components in the UPS 5. For example, separate PWM controllers can be used for the AC/DC converters 11, 21, and 31, the DC/AC converters 12, 22, and 32, the DC/DC module 41, and the DC bus balancer 42, although other configurations are possible. For example, separate PWM controllers having the same physical configuration, but using different control signals, can be used, or alternatively, PWM controllers having non-identical physical configurations can be used. The PWM controller can be configured to control the switching of a portion of the switches as a function of the frequency and phase of the AC input signal (e.g., using a feedback loop), or can be set in accordance with a desired output (e.g., to provide power of a desired frequency and phase to a load coupled to the DC/AC converters 12, 22, and 32).

Figure 2:
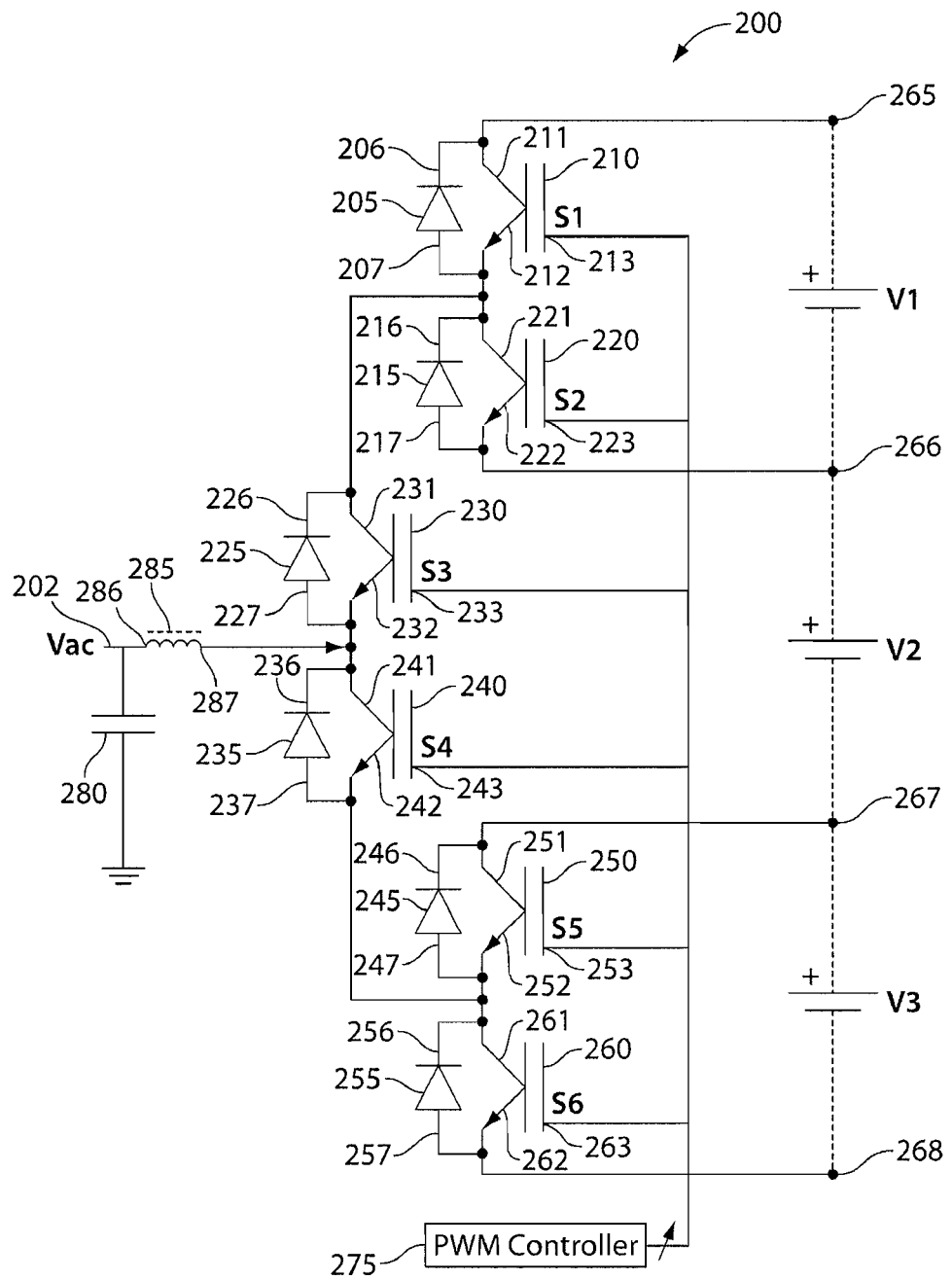
FIG. 2 is a circuit diagram of an AC/DC converter.

Referring to FIG. 2, an AC/DC converter 200 (e.g., an exemplary embodiment of the AC/DC converters 11, 21, and 31) includes diodes 205, 215, 225, 235, 245, and 255, switches 210, 220, 230, 240, 250, and 260, a capacitor 280, and an inductor 285. The switches 210, 220, 230, 240, 250, and 260 are insulated gate bipolar transistors (IGBTs) although other switches can be used. Preferably, the switches 210, 220, 250, and 260 have a maximum voltage rating of 600V and the switches 230 and 240 have a maximum voltage rating of 1200V, although other voltage ratings are possible. An input 202 is configured to be coupled to, for example, one phase of the 3-phase power feed (e.g., the X phase). Coupled between the input 202 and a ground connection is the capacitor 280. A node 286 of the inductor 285 is also coupled to the input 202. Coupled to a node 287 of the inductor 285 is an anode 227 of the diode 225, an emitter 232 of the switch 230, a cathode 236 of the diode 235, and a collector 241 of the switch 240. A cathode 226 of the diode 225 is coupled to a collector 231 of the switch 230. An anode 237 of the diode 235 is coupled to an emitter 242 of the switch 240. The cathode 226, the collector 231, an anode 207 of the diode 205, an emitter 212 of the switch 210, a cathode 216 of the diode 215, and a collector 221 of the switch 220 are coupled together. The anode 237, the emitter 242, an anode 247 of the diode 245, an emitter 252 of the switch 250, a cathode 256 of the diode 255, and a collector 261 of the switch 260 are coupled together. A cathode 206 of the diode 205 and a collector 211 of the switch 210 are coupled to an output 235. An anode 217 of the diode 215 and an emitter 222 of the switch 220 are coupled to an output 240. A cathode 246 of the diode 245 and a collector 251 of the switch 250 are coupled to an output 245. An anode 257 of the diode 255 and an emitter 262 of the switch 260 are coupled to an output 250. Gates 213, 223, 233, 243, 253, and 263 of the switches 210, 220, 230, 240, 250, and 260, respectively, are each coupled to a pulse width modulation controller 275 as will be described in more detail below. The outputs 265, 266, 267, and 268 are configured to be coupled to the buses 64, 63, 61, and 60, respectively. The inductor 285 preferably has an inductance of 100 uH, although other inductances can be used (e.g., depending on the power rating of the system 5). The capacitor preferably has a capacitance of 200 uF, although other capacitances can be used (e.g., depending on the power rating of the system 5).

The AC/DC converter 200 is configured to receive AC power from, for example, one phase of a 3-phase power connection and to provide a multi-level DC output via the outputs 265, 266, 267, and 268. For example, when the AC/DC converter 200 is in operation and the input 202 is coupled to a 480 VAC power feed, the AC/DC converter 200 can to induce a voltage (relative to a neutral connection of the power feed) of about +450 VDC across the output 265 and the neutral connection, a voltage of about +150 VDC across the output 266 and the neutral, a voltage of about −150 VDC across the output 267 and the neutral, and a voltage of about −450 VDC across the output 268 and the neutral. Likewise, the AC/DC converter 200 is configured to induce a voltage of about 300 VDC across the outputs 265 and 266 (V1), the outputs 266 and 267 (V2), and the outputs 267 and 268 (V3).

Preferably the voltage induced on the outputs 265 and 268 is a function of the input voltage. The voltage induced on the outputs 265 and 268 is preferably equal to or greater than the voltage across the capacitor 280 multiplied by $\sqrt{2}$ root). The voltage across the capacitor 280 (i.e., the phase-neutral voltage) is preferably substantially equal to:

$$\frac{\text{(Voltage at input 202)}}{\sqrt{3}} = (\text{Phase} - NeutralVoltage) \quad (1)$$

(if a neutral connection is available) and the instantaneous peak voltage across the capacitor 280 varies between ±(Phase-Neutral Voltage)($\sqrt{2}$). Preferably, the AC/DC converter 200 is configured such that the voltage provided on the output 265 is greater than the positive peak instantaneous voltage across the capacitor 280 and the voltage provided on the output 268 is lower than the negative peak instantaneous voltage across the capacitor 280. For example, assuming an input of 480 V at the input 202, the phase-neutral is approximately 277 Vrms, and the instantaneous peak voltage across the capacitor 280 is about 392 V. Thus, in this example, the AC/DC converter 200 is configured such that the output 265 outputs a voltage of about 392 V or greater (e.g., 450 V) and the output 268 outputs a voltage of about −392 or less (e.g., −450 V). Increasing the difference between the absolute value of the voltages output on the outputs 265 and 268 and the absolute value of the peak instantaneous voltages across the capacitor 280 can increase the operating tolerance of the system 5.

The combination of the capacitor 280, the inductor 285, and the switches 210, 220, 230, 240, 250, and 260 is configured to act as a boost converter and to convert the AC signal provided to the input 202 into a four-level quasi-square wave (e.g., as shown as a signal 305 in FIG. 8) at the node 287 of the inductor 285. The voltage at the node 287 can vary depending on the state of the switches 210, 220, 230, 250, 260 (as described more fully below). For example, when the instantaneous value of the AC voltage present on the input 202 is between a first voltage level equal to the DC voltage at node 265 (e.g., 450 V, as determined by the configuration of the AC/DC converter 200) and a second voltage level equal to the DC voltage at the node 266 (e.g., 150 V), the square wave at the node 287 of the inductor 285 switches between these values (here 450 V and 150 V); when the instantaneous value of the AC voltage present on the input 202 is between the second voltage level equal to the DC voltage at the node 266 and a third voltage level equal to the DC voltage at the node 267 (e.g., −150 V), the square wave at the node 287 of the inductor 285 switches between these values (here 150 V and −150 V); and when the instantaneous value of the AC voltage present on the input 202 is between the third voltage level equal to the DC voltage at the node 267 and a fourth voltage level equal to the DC voltage at the node 268 (e.g., −450 V), the square wave at the node 287 of the inductor 285 switches between these values (e.g., −150 V and −450V). Furthermore, the combination of the capacitor 280 and the inductor 285 is configured to act as a low pass filter.

Figure 3:
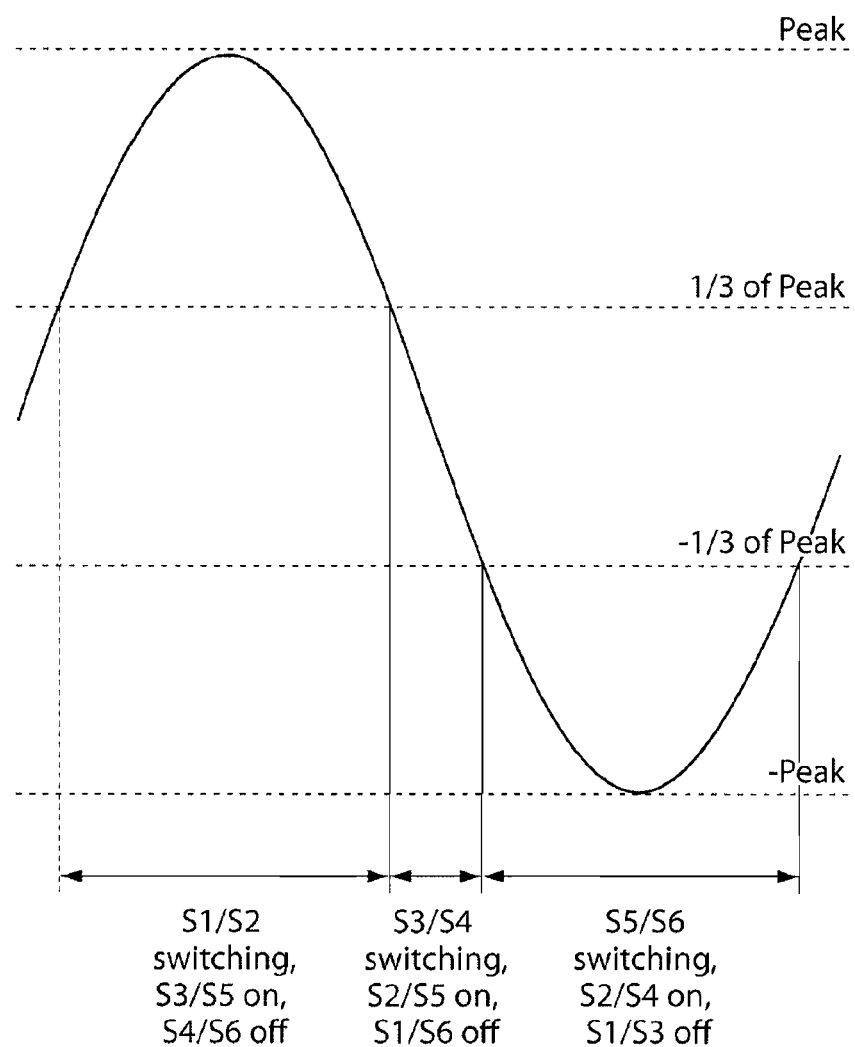
FIG. 3 is a graph representing an exemplary power signal provided to the AC/DC converter of FIG. 2.
Figure 4A:
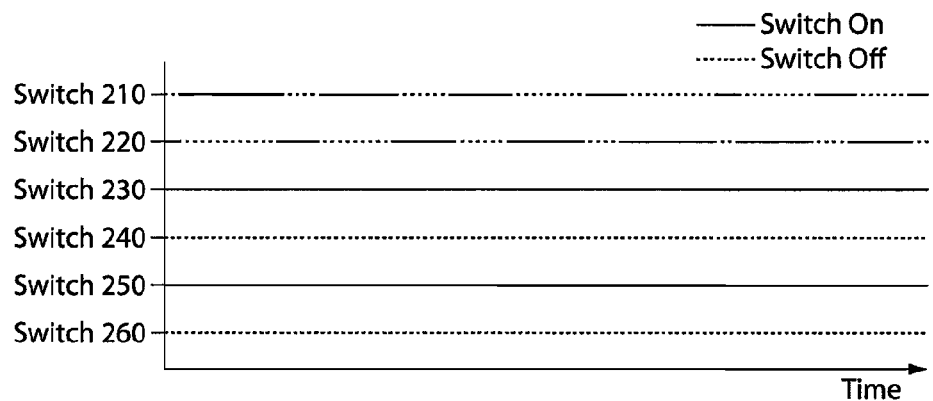
FIGS. 4A-4C are graphs representing states of switches in the AC/DC converter of FIG. 2.
Figure 4B:
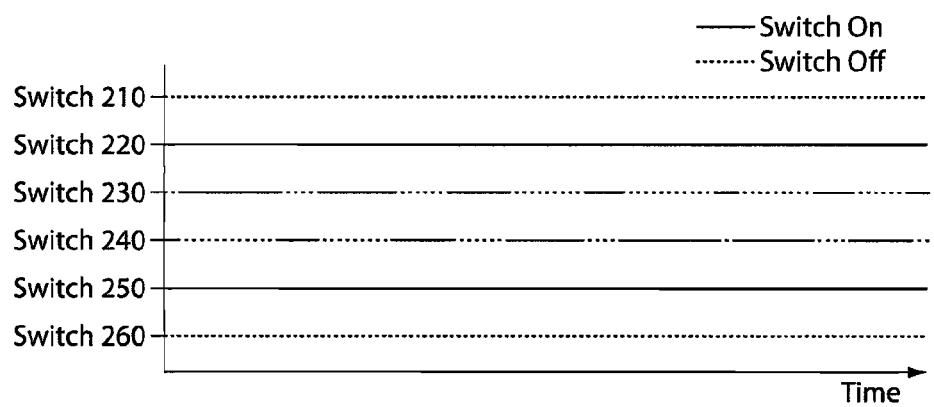
Figure 4C:
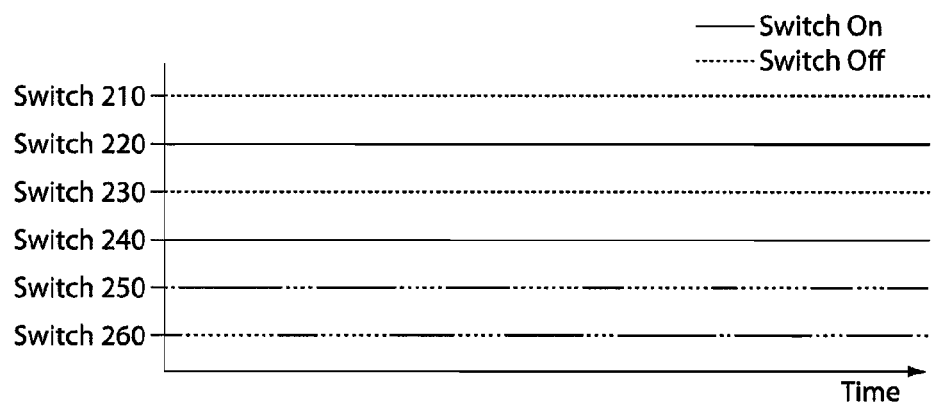

The AC/DC converter 200 is configured to induce voltages at the outputs 265, 266, 267, and 268 by switching the switches 210, 220, 230, 240, 250, and 260. The switches are configured to be actuated by the PWM controller 275. The PWM controller 275 is configured to control the switches 210, 220, 230, 240, 250, and 260 according to which one of three states the AC/DC converter 200 is operating in. Referring also to FIG. 3, the AC/DC converter 200 is configured to operate in three states. The first state corresponds to when the input voltage received by the input 202 is above one-third of the voltage provided by the output 265 (e.g., if the peak input voltage is ±450 VAC, then the first state corresponds to when the input is above 150 V). The second state corresponds to when the input received by the input 202 is between one-third of the voltage provided by the output 265, and one-third of the voltage provided by the output 268 (e.g., 150 V and −150 V). The third state corresponds to when the input received by the input 202 is below one-third of the voltage provided by the output 268 (e.g., below −150V). Referring also to FIG. 4, the PWM controller 275 is configured such that during the first state the switches 230 and 250 are set to their on (conducting) states the switches 240 and 260 are set to their off (non-conducting) states, and the switches 210 and 220 are switching between off and on states (FIG. 4A). The PWM controller 275 is configured such that during the second state, the switches 220 and 250 are on, the switches 210 and 260 are off, and the switches 230 and 240 are switching (FIG. 4B). The PWM controller 275 is configured such that during the third state, the switches 220 and 240 are on, the switches 210 and 230 are off, and the switches 250 and 260 are switching (FIG. 4C).

Figure 5:
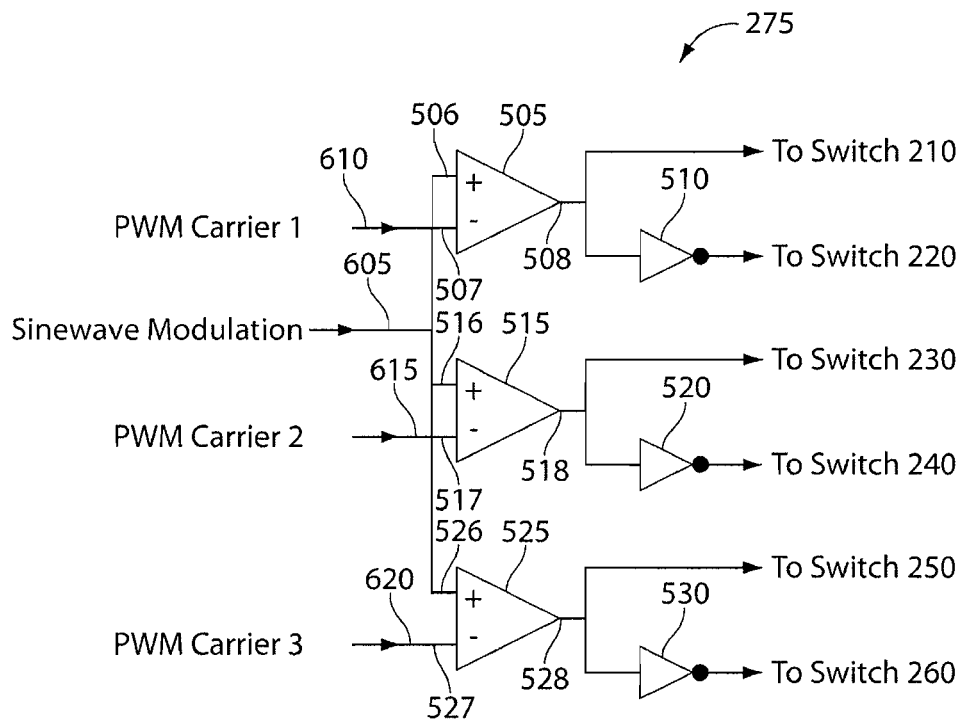
FIG. 5 is a circuit diagram of a pulse width modulation control circuit.
Figure 6:
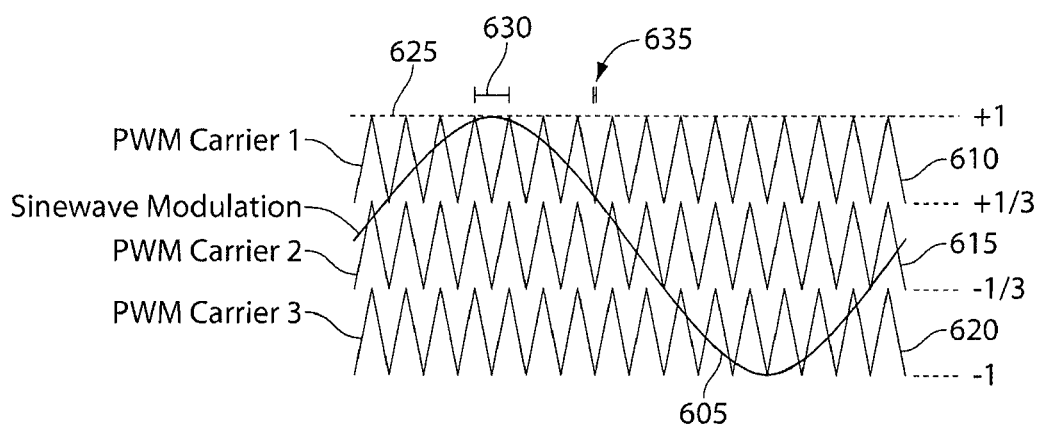
FIG. 6 is a diagram of exemplary control signals for use with the pulse width modulation control circuit of FIG. 5.

Referring to FIGS. 5-6, the PWM controller 275 is configured to control the switches 210, 220, 230, 240, 250, and 260 using control signals. The PWM controller 275 includes comparators 505, 515, and 525, and logic inverters 510, 520, and 530. The PWM controller 275 is configured to cause the AC/DC converter 200 to operate in the states described herein in order to convert an incoming AC signal to the DC signals described herein. A positive input 506 of the comparator 505 is coupled to a sinewave modulation signal source (to receive a signal 605), and a negative input 507 of the comparator 505 is coupled to a first PWM carrier signal 610. A positive input 516 of the comparator 515 is coupled to the sinewave modulation signal, and a negative input 517 of the comparator 515 is coupled to a second PWM carrier signal 615. A positive input 526 of the comparator 525 is coupled to the sinewave modulation signal, and a negative input 527 of the comparator 525 is coupled to a third PWM signal 620. An output 508 of the comparator 505 is coupled to the switch 210, and to the switch 220 via the logic inverter 510. An output 518 of the comparator 515 is coupled to the switch 230 and to the switch 240 via the logic inverter 520. An output 528 of the comparator 525 is coupled to the switch 250 and to the switch 260 via the logic inverter 530.

The control signals used by the PWM controller 275 are selected to achieve the desired switching pattern of the switches 210, 220, 230, 240, 250, and 260. The signals 605, 610, 615, and 620 are preferably low voltage signals generated by, for example, a waveform generator. The sinewave signal 605 is a sinusoidal signal having a frequency and phase about equal to the frequency and phase of the power feed provided to the input 202. The sinewave signal 605 has a peak amplitude about equal to a threshold 625, which can be various values, e.g., 1V. The first PWM carriers 610, 615, and 620 are triangular waves having a frequency substantially equal to the desired PWM switching frequency of the AC/DC converter 200, although other frequencies are possible. The PWM switching frequency of the AC/DC converter 200 is preferably chosen as a compromise between IGBT switching losses and the physical size and cost of input and output inductors and capacitors (e.g., the capacitor 280 and the inductor 285). A maximum value of the PWM control signal 610 is about equal to the threshold 625 and a minimum value of the first PWM control signal 610 is about equal to one-third of the threshold 625. A maximum value of the PWM control signal 615 is about equal to one-third of the threshold 625 and a minimum value of the PWM control signal 615 is about equal to negative one-third of the threshold 625. A maximum value of the PWM control signal 620 is about equal to negative one-third of the threshold 625 and a minimum value of the PWM control signal 620 is about equal to the threshold 625 multiplied by −1.

The PWM controller 275 is configured to switch the switches 210, 220, 230, 240, 250, and 260 using the sinewave modulation signal 605 and the PWM control signals 610, 615, and 620. As the sinewave modulation signal 605 varies, the comparator 505 will output either a logic one or a logic zero, corresponding to which of the positive input 505 or the negative input 507 is greater. The comparator 505 is configured to output a logic one if the positive input 506 is greater than the negative input 507, (e.g., the voltage of the sinewave modulation signal 605 is greater than the voltage of the PWM control signal 610). Likewise, the comparator 505 is configured to output a logic zero if the positive input 506 is less than the negative input 507, (e.g., the voltage of the sinewave modulation signal 605 is less than the voltage of the PWM control signal 610). While the above discussion has focused on the operation of the comparator 505, the operation of the comparators 515 and 525 is preferably similar. Preferably, the PWM controller 275 is configured to insert small "dead bands" such that there is a slight delay between the switching off any given switch and switching on another switch (e.g., to guard against undesired pairs of the switches being on simultaneously). The switches 210, 220, 230, 240, 250, and 260 are configured such that a logic 1 turns the switch on, while a logic 0 turns the switch off, although the reverse is possible.

The PWM controller 275 can be configured to vary the duty cycle at which the switches it controls are switched at. For example, using the signals 610, 615, 620, and 625, the duty cycle of the switches that are being repeatedly toggled (e.g., in the first state, the switches 210 and 220) is varied. Comparing intervals 630 and 635, which indicate when the switch 210 is turned on and the switch 220 is turned off, the interval 630 is larger than the interval 635.

Referring again to FIG. 2, examples of the operation of the AC/DC converter 200 will be described. The AC/DC converter 200 is configured to provide the respective DC voltages to the outputs 265, 266, 267, and 268 by acting as a boost converter. For example, in the first state when the switch 220 is on and the switch 210 is off, the inductor 285 will store energy. When the switch 220 is off, the energy stored in the inductor 285 causes a current to freewheel through the diode 205. In the second state when the switch 230 is on and the switch 240 is off, the inductor 285 will store energy. When the switch 230 is off, the inductor 285 causes a current to freewheel through the diode 235. In the third state, when the switch 250 is on, and the switch 260 is off, the inductor 285 will store energy. When the switch 250 is off, the energy stored in the inductor 285 causes a current to freewheel through the diode 255.

Figure 7:
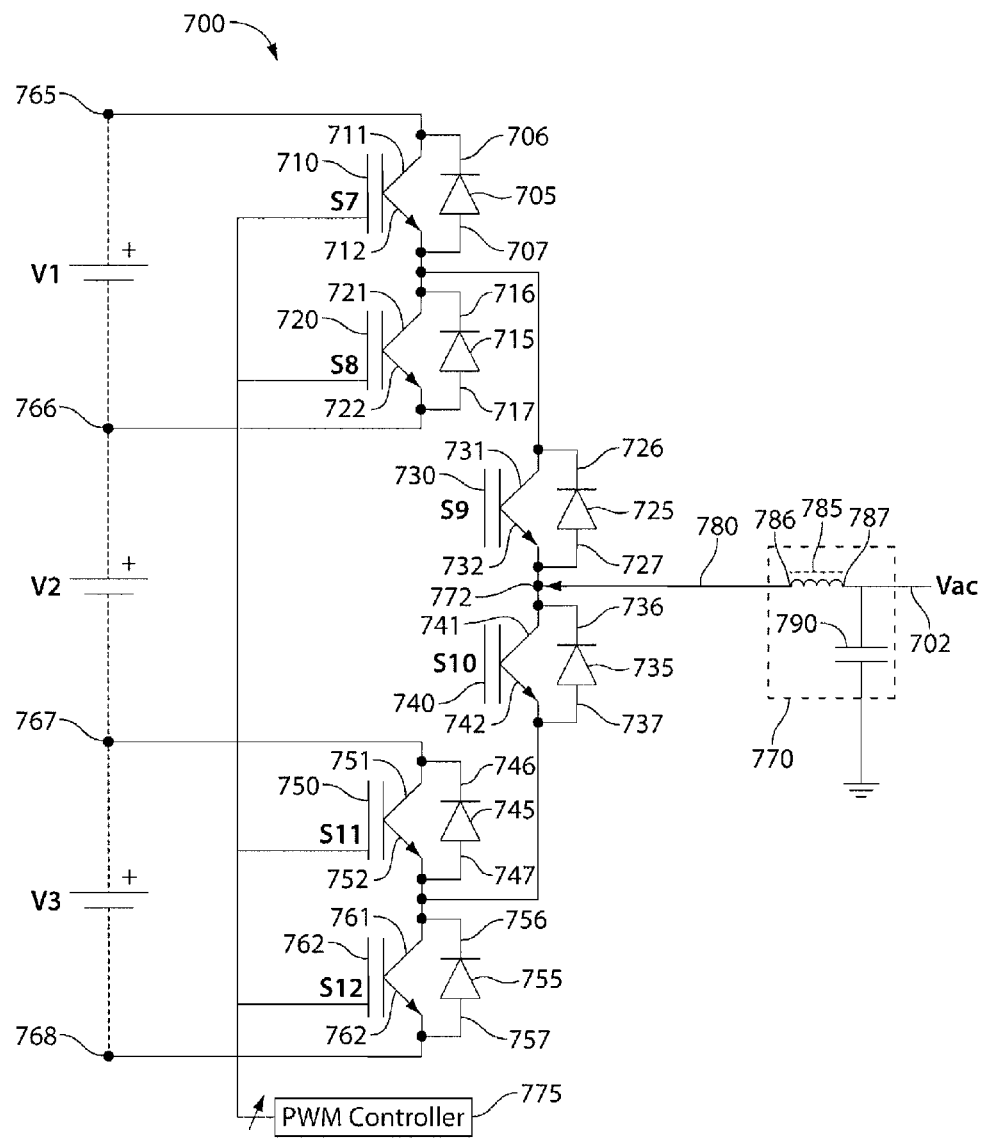
FIG. 7 is a circuit diagram of a DC/AC converter.

Referring to FIGS. 2 & 7, a DC/AC converter 700 (e.g., an exemplary embodiment of the DC/AC converters 12, 22, and 32) includes diodes 705, 715, 725, 735, 745, and 755, switches 710, 720, 730, 740, 750, and 760, inputs 765, 766, 767, and 768, a filter 770, and an output 702. The switches 710, 720, 730, 740, 750, and 760 are IGBTs although other transistors can be used. Inputs 765, 766, 767, and 768 are configured to receive DC power from, for example, the AC/DC converter 200. Coupled to the output 702 is an anode 727 of the diode 725, an emitter 732 of the switch 730, a cathode 736 of the diode 735, and a collector 741 of the switch 743. A cathode 726 of the diode 725 is coupled to a collector 731 of the switch 730. An anode 737 of the diode 735 is coupled to an emitter 742 of the switch 740. The cathode 726, the collector 731, an anode 707 of the diode 705, an emitter 712 of the switch 710, a cathode 716 of the diode 715, and a collector 721 of the switch 720 are coupled together. The anode 737, the emitter 742, an anode 747 of the diode 745, an emitter 752 of the switch 750, a cathode 756 of the diode 755, and a collector 761 of the switch 760 are coupled together. A cathode 706 of the diode 705 and a collector 711 of the switch 710 are coupled to the input 765. An anode 717 of the diode 715 and an emitter 722 of the switch 720 are coupled to the input 766. A cathode 746 of the diode 745 and a collector 751 of the switch 750 are coupled to the input 767. An anode 757 of the diode 755 and an emitter 762 of the switch 760 are coupled to the input 768. Bases 713, 723, 733, 743, 753, and 763 of the switches 710, 720, 730, 740, 750, and 760, respectively, are each coupled to a pulse width modulation controller as will be described in more detail below. The emitter 732 of the switch 730, the anode 727 of the diode 725, the collector 741 of the switch 740, and the cathode 736 of the diode 735 (i.e., defining a node 772) are coupled to the filter 770. The filter 770 includes inductor 785 and capacitor 790. The inductor 786 is coupled between the node 772 and the output 702. The capacitor 790 is coupled between the output 702 and the ground. The inductor 785 preferably has an inductance of 100 uH, although other inductances can be used (e.g., depending on the power rating of the system 5). The capacitor 790 preferably has a capacitance of 200 uF, although other capacitances can be used (e.g., depending on the power rating of the system 5).

The DC/AC converter 700 is configured to receive DC power from, for example, the AC/DC converter 200, and to provide an AC output via the output 702. For example, when the DC/AC converter 700 is in operation, and the inputs 765, 766, 767, and 768 are coupled to the outputs 265, 266, 267, and 268, respectively, of the AC/DC converter 200, an AC output can be induced on the output 702. The DC/AC converter 700 is configured to induce on the output 702 an AC output having peak voltages (e.g., relative to the neutral connection) about equal to the voltages present on the input 765 (e.g., a positive peak voltage of the signal at the output 702) and the input 768 (e.g., a negative peak voltage of the signal at the output 702). Other voltages, however, can be induced.

The DC/AC converter 700 can be realized as a voltage or current controlled DC/AC converter. Preferably, an "outer" voltage loop is used to maintain a desired voltage when operating the DC/AC converter 700 using current control. For example, a control circuit (not shown) can be configured to monitor the current flow in the inductor 785 and to monitor the voltage present at the output 702 (e.g., to determine if the output is sinusoidal). The control circuit can be configured to adjust a PWM signal provided to the switches 710, 720, 730, 740, 750, and 760, based on the measured current and voltage values to maintain the desired output voltage. The DC/AC converter 700 can be configured to be operated with a fixed or variable PWM frequency, as described herein.

The DC/AC converter 700 is configured to convert the DC voltages present at the inputs 765, 766, 767, and 768 into an AC output voltage by switching the switches 710, 720, 730, 740, 750, and 760. The switches are configured to be actuated by a PWM controller 775 that is preferably configured in a manner similar to the PWM controller 275. The control signals provided to the PWM controller 775 can be similar to those provided to the PWM controller 275, although frequencies and/or amplitudes of the control signals can vary to produce a desired output for a load coupled to the output 702. Preferably, the DC/AC converter 700 is configured such that that in any given part of a line cycle (e.g., a cycle through the first, second, and third states) two of the six switches 710, 720, 730, 740, 750, and 760 are toggled in a complementary manner, while the remaining four switches are either constantly switched off or constantly switched on.

Figure 8:
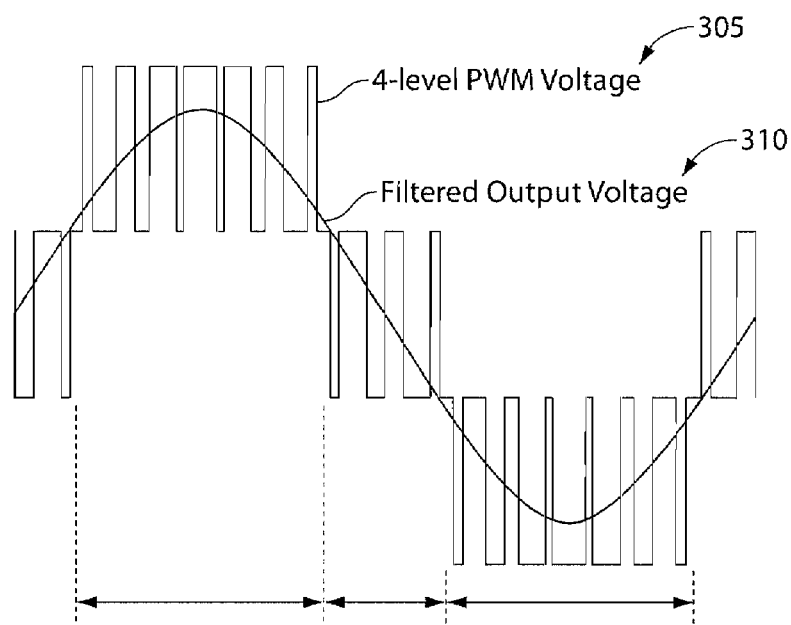
FIG. 8 is a graph representing exemplary AC and DC power signals.
Figure 9A:
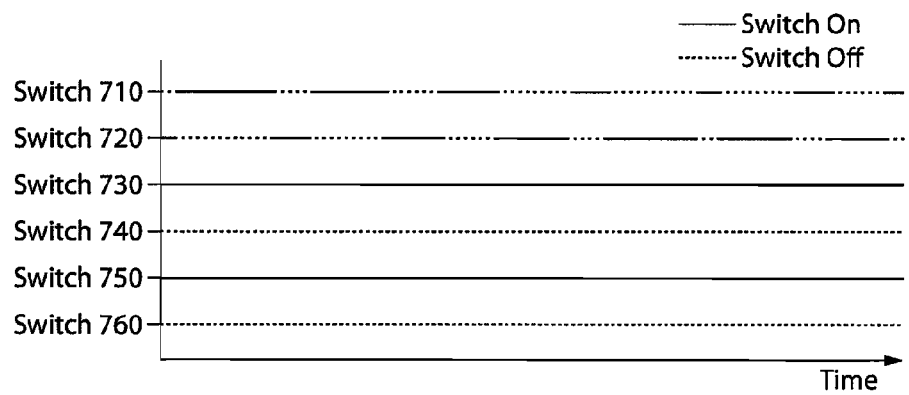
FIG. 9A-9C are graphs representing states of switches in the DC/AC converter of FIG. 8.
Figure 9B:
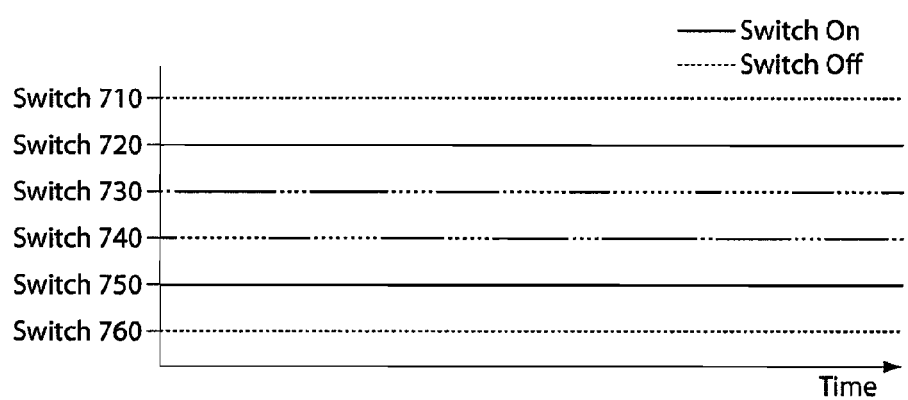
Figure 9C:
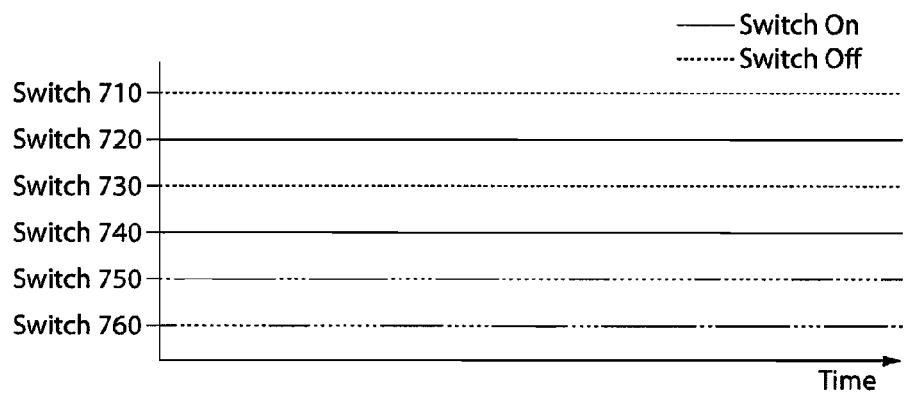

Referring also to FIG. 8, the PWM controller 775 can cause the DC/AC converter 700 to operate in three states. The first state corresponds to times when the voltage output provided at the output 702 is above one-third of the voltage provided on the input 765 (e.g., voltage on the input is 450 V, then the first state corresponds to times when the output is above 150 V). The second state corresponds to times when the output provided at the output 702 is between one-third of the voltage provided on the input 765, and one-third of the voltage provided in the input 768 (e.g., −150V and 150V). The third state corresponds to times when the output voltage provided at the output 702 is below one-third of the voltage provided on the input 768 (e.g., below −150V). The PWM controller 775 is configured such that during the first state, the switches 730 and 750 are switched on, the switches 740 and 760 are switched off, and the switches 710 and 720 are switching (see FIG. 9A). The PWM controller 775 is configured such that during the second state, the switches 720 and 750 are switched on, the switches 710 and 760 are switched off, and the switches 730 and 740 are switching (FIG. 9B). The PWM controller 775 is configured such that during the third state, the switches 720 and 740 are switched on, the switches 710 and 730 are switched off, and the switches 750 and 760 are switching (FIG. 9C). In the first state, the switching configuration of the switches 710, 720, 730, 740, 750, and 760 is configured to cause a square wave voltage at a node 780 that varies between 450 V and 150 V, with a varying duty cycle. For example, the duty cycle of the square wave can vary according to which portion of which state the DC/AC converter is operating in (e.g., as the voltage of the output approaches 450 V in the first state, the duty cycle of the square wave approaches 100%). In the second state, the switching configuration of the switches 710, 720, 730, 740, 750, and 760 is configured to cause a square wave voltage at the node 780 that varies between 150V and −150V, with a varying duty cycle. In the third state, the switching configuration of the switches 710, 720, 730, 740, 750, and 760 is configured to cause a square wave voltage at the node 780 that varies between −150 and −450 V, with a varying duty cycle.

The filter 770 is configured to filter the output provided at the node 772 into a substantially AC output voltage which is provided to the output 702. The filter 770 can be an L-C low pass filter, although other filter configurations are possible.

Figure 10:
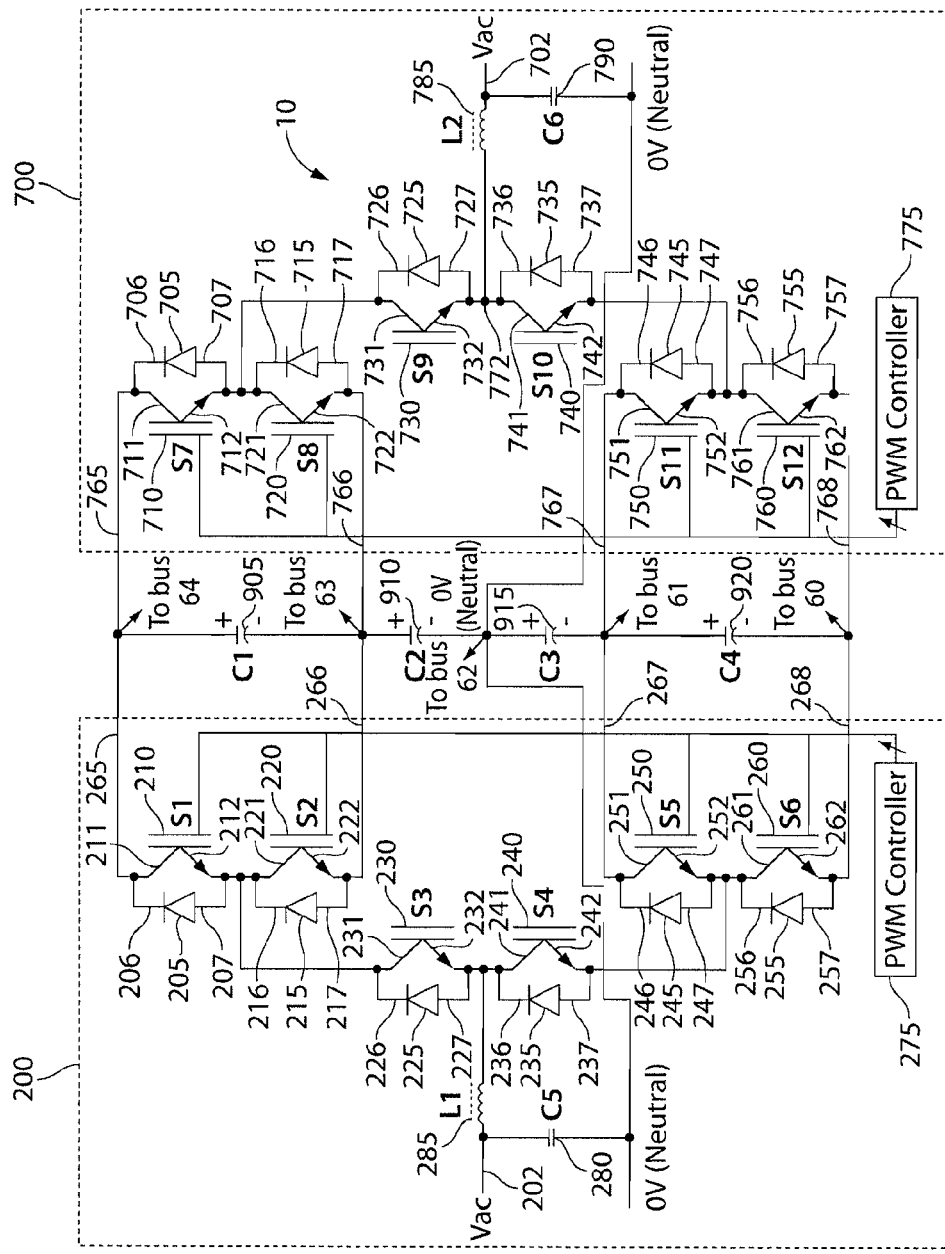
FIG. 10 is a circuit diagram of an AC/AC converter.

Referring to FIG. 10, the AC/AC module 10 includes the AC/DC converter 200, the DC/AC converter 700, capacitors 905, 910, 915, and 920. The outputs 265, 266, 267, and 268 are coupled to the inputs 765, 766, 767, and 768, respectively. The capacitor 905 is coupled between the junction of the output 265 and the input 765 and the junction of the output 266 and the input 766. The capacitor 910 is coupled between the junction of the output 266 and the input 766 and the neutral connection. The capacitor 915 is coupled between the neutral connection and the junction of the output 267 and the input 767. The capacitor 920 is coupled between the junction of the output 267 and the input 767 and the junction of the output 268 and the input 768. Furthermore, the junction of the output 265 and the input 765 is coupled to the bus 64. The junction of the output 266 and the input 766 is coupled to the bus 63. The junction of the output 267 and the input 767 is coupled to the bus 60. The junction of the output 268 and the input 768 is coupled to the bus 61.

The capacitors 905, 910, 915, and 920 are configured to store energy for a short period of time when, for example, the frequency of the power signal provided to the input 202 differs from the signal frequency provided by the output 702 and to reduce ripple current present on the buses 60, 61, 62, 63, and/or 64. The AC/AC module 10 is configured to, in operation, induce a 300 V potential across the capacitors 905 and 920, and a 150 V potential across the capacitors 910 and 915.

Figure 11:
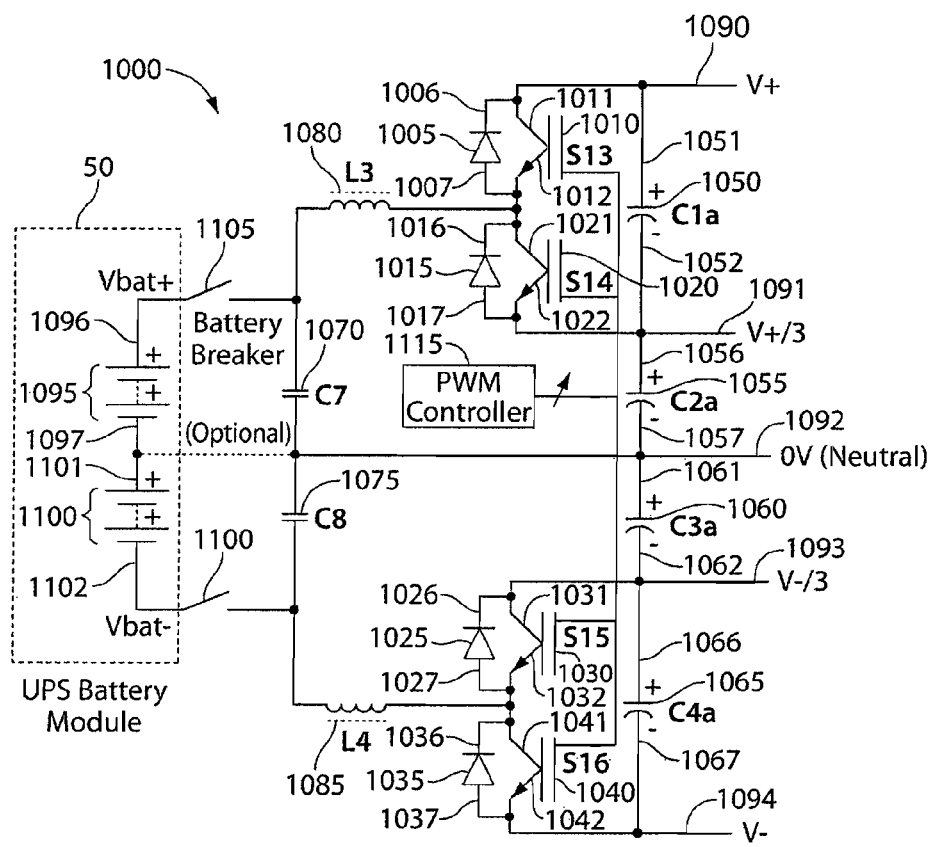
FIG. 11 is a circuit diagram of a DC/DC converter.

Referring to FIGS. 1 and 11, a DC/DC converter 1000 (e.g., an exemplary embodiment of the DC/DC converter 41) is coupled to the battery 50 and includes diodes 1005, 1015, 1025, and 1035, switches 1010, 1020, 1030, and 1040, capacitors 1050, 1055, 1060, 1065, capacitors 1070, and 1075, and inductors 1080 and 1085. The switches 1010, 1020, 1030, and 1040 are preferably IGBTs, although other switches can be used. Preferably, the diodes are fast or ultra fast reverse recovery diodes (e.g., as can be used elsewhere in the system 5). A cathode 1006 of the diode 1005 is coupled to a collector 1011 of the switch 1010, and is further coupled to the node 1090. An anode 1007 of the diode 1005, an emitter 1012 of the switch 1010, a cathode 1016 of the diode 1015, and a collector 1021 of the switch 1020 are coupled together. An anode 1017 of the diode 1015 and an emitter 1022 of the switch 1020 are coupled together, and are further coupled to the node 1091. A positive terminal 1051 of the capacitor 1050 is coupled to the node 1090 and a negative terminal 1052 of the capacitor 1050 is coupled to the node 1091. The capacitor 1070 and the inductor 1080 are coupled between the junction of the anode 1007, the emitter 1012, the cathode 1016, and the collector 1021 and the node 1092. Preferably, the inductor 1080 is coupled to the junction of the anode 1007, the emitter 1012, the cathode 1016, and the collector 1021, and the capacitor 1070 is coupled to the node 1092. A positive terminal 1056 of the capacitor 1055 is coupled to the node 1091, and a negative terminal 1057 of the capacitor 1055 is coupled to the node 1092. A cathode 1026 of the diode 1025 is coupled to a collector 1031 of the switch 1030, and is further coupled to the node 1093. An anode 1027 of the diode 1025, an emitter 1032 of the switch 1030, a cathode 1036 of the diode 1035, and a collector 1041 of the switch 1040 are coupled together. An anode 1037 of the diode 1035 and an emitter 1042 of the switch 1040 are coupled together, and are further coupled to the node 1094. A positive terminal 1066 of the capacitor 1065 is coupled to the node 1093 and a negative terminal 1067 of the capacitor 1065 is coupled to the node 1094. The capacitor 1075 and the inductor 1085 are coupled between the junction of the anode 1027, the emitter 1032, the cathode 1036, and the collector 1041 and the node 1092. Preferably, the inductor 1085 is coupled to the junction of the anode 1027, the emitter 1032, the cathode 1036, and the collector 1041, and the capacitor 1075 is coupled to the node 1092. A positive terminal 1061 of the capacitor 1060 is coupled to the node 1092, and a negative terminal 1062 of the capacitor 1060 is coupled to the node 1093. The nodes 1090, 1091, 1092, 1093, and 1094 are configured to be coupled to the buses 64, 63, 62, 61, and 60, respectively. The switches are configured to be coupled to a PWM controller 1115. While the capacitors 1050, 1055, 1060, and 1065 have been assigned different reference numbers in the figures, the capacitors 1050, 1055, 1060, and 1065 can be the capacitors 905, 910, 915, and 920, respectively.

The DC/DC converter 1000 is configured provide power to and receive power from batteries 1095 and 1100. The batteries 1095 and 1100 are coupled to the DC/DC converter 1000 via circuit breakers 1105 and 1110. A positive terminal 1096 of the battery 1095 is coupled to the junction of the capacitor 1070 and the inductor 1080 via the breaker 1105. A negative terminal 1097 of the battery 1095 is coupled to a positive terminal 1101 of the battery 1100. A negative terminal 1102 of the battery 1100 is coupled to the junction of the capacitor 1075 and the inductor 1085 via the breaker 1110. Optionally, the negative terminal 1097 of the battery 1095 and the positive terminal 1101 of the battery 1100 can be coupled to the node 1092 to reduce the maximum voltage across the battery breakers. Preferably, the batteries 1095 and 1100 are configured to receive and provide a voltage that is between the peak voltage of the system 5 (e.g., the voltage present on the bus 64) and one-third of the peak voltage of the system 5 (e.g., the voltage present on the bus 63). For example, the batteries 1095 and 1100 can be configured to provide about 288 V.

The DC/DC converter 1000 is configured to operate in two states, a charge state and a discharge state. During the charge state the DC/DC converter 1000 acts as a buck converter and receives a first DC voltage set from the buses 60, 61, 63, and 64 and to provide a DC voltage of a first level to the batteries 1095 and 1110. During the discharge state, the DC/DC converter 1000 receives DC power of a second level and provides a second DC voltage set to the buses 60, 61, 63, and 64, respectively. The first voltage set and the second voltage set can be substantially equal. The first DC voltage and the second DC voltage can be substantially equal. During the charge state, the DC/DC converter 1000 actively charges the batteries 1095 and 1100, and/or provides a float charge (e.g., to maintain a charge in a fully charged battery).

The switches 1010, 1020, 1030, and 1040 are configured to be controlled by a PWM controller 1115. Preferably, a configuration of the PWM controller 1115 is similar to the PWM controller 275, although other configurations are possible. Preferably, the switches 1010 and 1040 are controlled to switch in a similar manner (e.g., both of the switches 1010 and 1040 are switched on at about the same time) and the switches 1020 and 1030 are controlled to switch in a similar manner (e.g., both of the switches 1020 and 1030 are switched on at about the same time). If, however, the junction of the negative terminal 1097 and the positive terminal 1101 is coupled to the node 1092, each of the switches 1010, 1020, 1030, and 1040 can be switched independently. The PWM controller 1115 is configured to vary the charging voltage of the battery 1095 by varying the duty cycle of the switch 1010. Likewise, the PWM controller 1115 can vary the charging voltage of the battery 1110 by varying the duty cycle the switch 1040.

When the DC/DC converter 1000 is operating in the charge state, the PWM controller 1115 causes the DC/DC converter 1000 to operate as a buck converter by repeatedly switching the switches 1010 and 1040 while keeping the switches 1020 and 1030 switched off. When the switches 1010 and 1040 are on, the DC/DC converter 1000 the voltages present at the nodes 1090 and 1094 charge the inductors 1080 and 1085. When the switches 1010 and 1040 are off, the choke currents (e.g., caused by the inductors 1080 and 1085 discharging) free-wheel through the diodes 1015 and 1025. The DC/DC converter 1000 is configured to step-down the voltages present at the nodes 1090 and 1094 by varying the duty cycle at which the switches 1010 and 1040 are switched. For example, as the duty cycle of the switching signal provided by the PWM controller 1115 increases towards 1, the voltage provided to the batteries 1095 and 1100 increases towards the voltage present at the nodes 1090 and 1094. The capacitors 1070 and 1075 are configured to reduce ripple current by filtering out high-frequency components of the signal provided to the batteries 1095 and 1110.

When the DC/DC converter 1000 is operating in the discharge state, the PWM controller 1115 causes the DC/DC converter 1000 to operate as a buck-boost converter by repeatedly switching the switches 1020 and 1030 while keeping the switches 1010 and 1040 off. For example, the DC/DC converter 1000 provides a stepped-up voltage from the batteries 1095 and 1100 to the nodes 1090 and 1094, and provides a stepped-down voltage to the nodes 1091 and 1093. When the switches 1020 and 1030 are on, the batteries 1095 and 1100 cause the inductors 1080 and 1085 store energy. When the switches 1020 and 1030 are off, the energy stored in the inductors 1080 and 1085 (and energy provided by the batteries 1095 and 1100) is discharged (e.g., freewheels) through the diodes 1005 and 1035, respectively. The DC/DC converter 1000 is configured to step-up the voltage provided by the batteries 1095 and 1100 to the desired level by varying the duty cycle at which the switches 1020 and 1030 are switched. For example, as the duty cycle of the switching signal provided by the PWM controller 1115 increases towards 1, the voltage provided at the nodes 1090, 1091, 1093, and 1094 increases. The DC/DC converter 1000 is also configured to step-down the voltage provided by the batteries 1095 and 1100 and to provide the stepped-down voltage to the nodes 1091 and 1093. The DC/DC converter 1000 is configured to provide the stepped down voltage to the nodes 1091 and 1093 in a manner similar to that described above. The capacitors 1050, 1055, 1060, and 1065 are configured to filter out high-frequency components of the signals on the nodes 1090, 1091, 1093, and 1094.

Figure 12:
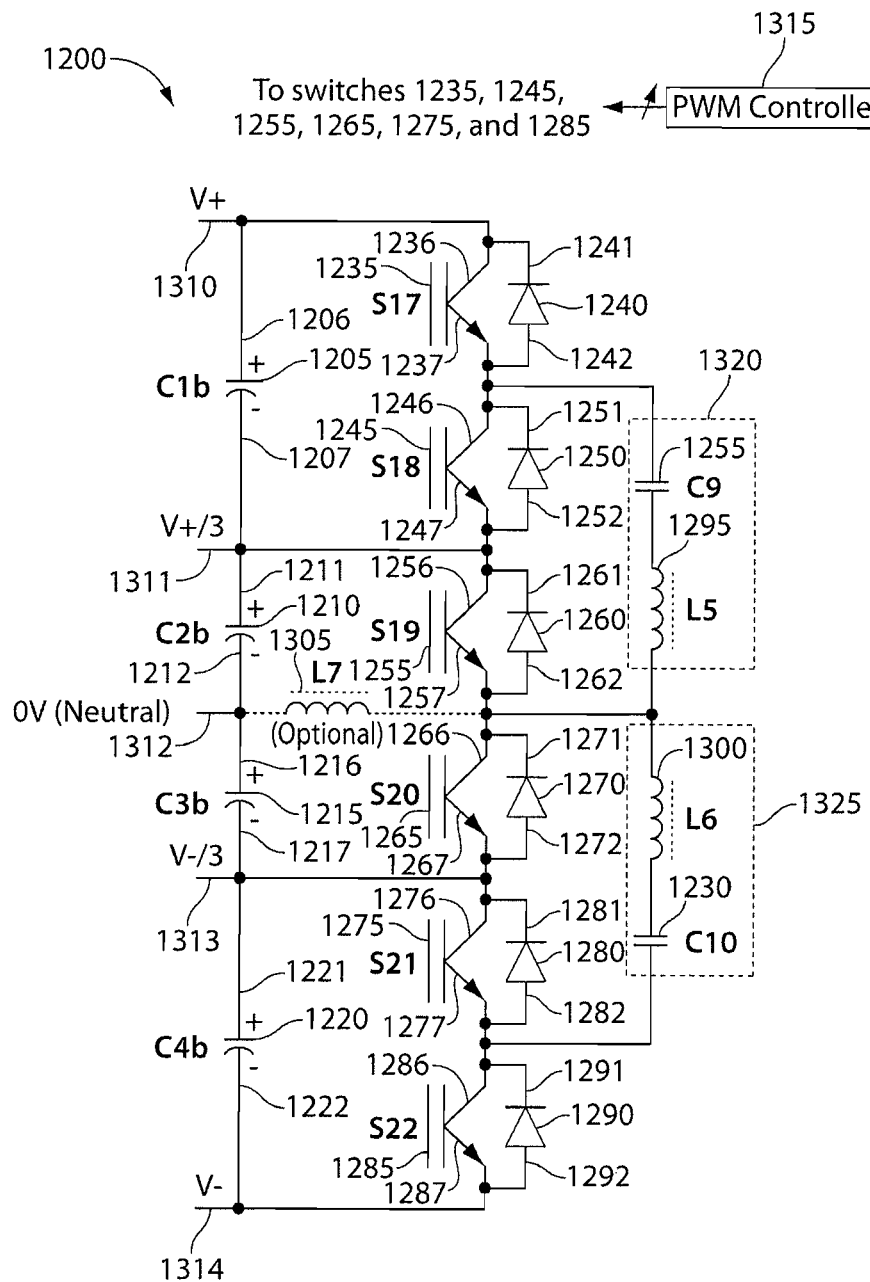
FIG. 12 is a circuit diagram of a DC bus balancer.

Referring to FIGS. 1 and 12, an example of the DC bus balancer 42, here a DC bus balancer 1200, includes capacitors 1205, 1210, 1215, 1220, 1225, and 1230, switches 1235, 1245, 1255, 1265, 1275, and 1285, diodes 1240, 1250, 1260, 1270, 1280, and 1290, and inductors 1295, 1300, and 1305. A positive terminal 1206 of the capacitor 1205, a collector 1236 of the diode 1235, and a cathode 1241 of the diode 1240 are coupled to a node 1310. An emitter 1237 of the switch 1235 an anode 1242 of the diode 1240 a collector 1246 of the switch 1245 and a cathode 1251 of the diode 1250 are coupled together. An emitter 1247 of the switch 1245, an anode 1252 of the diode 1250, a collector 1256 of the switch 1255, and a cathode 1261 of the diode 1260 are coupled together and are further coupled to a node 1311. An emitter 1257 of the switch 1255, an anode 1262 of the diode 1260, a collector 1266 of the switch 1265, and a cathode 1271 of the diode 1270 are coupled together. An emitter 1267 of the switch 1265, an anode 1272 of the diode 1270, a collector 1276 of the switch 1275, and a cathode 1281 of the diode 1280 are coupled together, and are further coupled to the node 1313. An emitter 1277 of the switch 1275 an anode 1282 of the diode 1280, a collector 1286 of the switch 1285, and a cathode 1291 of the diode 1290 are coupled together. An emitter 1287 of the switch 1285 and an anode 1292 of the diode 1290 are coupled together, and are further coupled to the node 1314. A positive terminal 1206 of the capacitor 1205 is coupled to the node 1310 and a negative terminal 1207 of the capacitor 1205 is coupled to the node 1311. A positive terminal 1211 of the capacitor 1210 is coupled to the node 1311 and a negative terminal 1212 of the capacitor 1210 is coupled to the node 1312. A positive terminal 1216 of the capacitor 1215 is coupled to the node 1312 and a negative terminal 1217 of the capacitor 1215 is coupled to the node 1313. A positive terminal 1221 of the capacitor 1220 is coupled to the node 1313 and a negative terminal 1222 of the capacitor 1220 is coupled to the node 1314. The capacitor 1225 and the inductor 1295 are coupled in series between the junction of the diodes 1240 and 1250 and the junction of the diodes 1260 and 1270. The inductor 1300 and the capacitor 1230 are coupled between the junction of the diodes 1260 and 1270 and the junction of the diodes 1280 and 1290. Thus, the capacitor 1225, the inductor 1295, the inductor 1300, and the capacitor 1230 are coupled in series between the junction of the diodes 1240 and 1250 and the diodes 1280 and 1290. The inductor 1305 is coupled between the node 1312 and the junction of the diodes 1260 and 1270. The inductor 1305, however, is optional. For example, if the AC/DC converters 11, 21, and 31 are configured to control an amount of power drawn from the AC input in respective positive and negative half-cycles. The DC bus balancer 1200 can be configured to reduce (and possibly eliminate) the desire to control power draw on the AC input using the AC/DC converters 11, 21, and 31 (e.g., in order to balance the buses 60, 61, 62, 63, and 64) by including the inductor 1305. The combination of the capacitor 1225 and the inductor 1295 define a resonant tank 1320, and the combination of the capacitor 1230 and the inductor 1300 define a resonant tank 1325.

Figure 13:
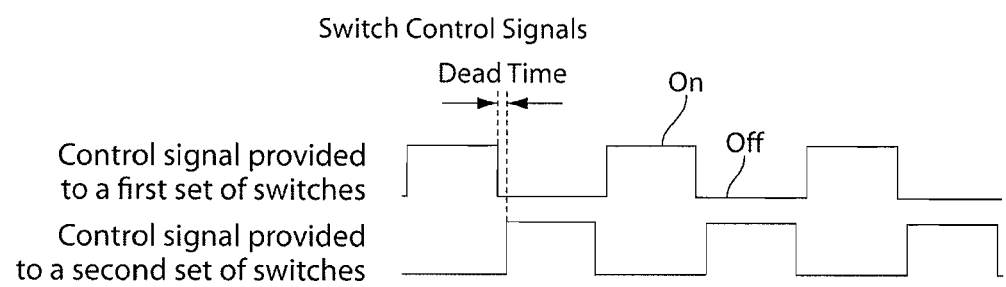
FIG. 13 is a graph representing exemplary signals for controlling switches included in the DC bus balancer of FIG. 12.

A PWM controller 1315 is coupled to each of the switches 1235, 1245, 1255, 1265, 1275, and 1285. The PWM 1315 controller is preferably configured in a manner similar to the PWM controller 275. For example, the PWM controller 1315 includes multiple comparators which are each configured to receive multiple control signals. The control signals are selected such that the desired switching sequence (e.g., as described herein in the DC bus balancer 42) is obtained. The PWM controller 1315 is configured to provide control signals that preferably have a constant frequency and duty cycle, although other configurations are possible. The control signals provided to the switches 1235, 1255, and 1275 are preferably substantially identical, and the control signals provided to the switches 1245, 1265, and 1285 are preferably substantially identical. The control signals preferably have a duty cycle of about 50%, although other duty cycles are possible. Referring also to FIG. 13, the PWM controller 1315 is configured to insert "dead time" between the switching of the switches 1235, 1245, 1255, 1265, 1275, and 1285 such that the switches being switched off are substantially completely off before other switches are switched on. The use of dead time, however, is optional. The PWM controller 1315 is configured to provide a control signal such that the switches 1235, 1245, 1255, 1265, 1275, and 1285 switch at a frequency about equal to a resonant frequency of the resonant tanks 1320 and 1325, although other frequencies are possible.

The DC bus balancer 1200 is configured to balance and maintain desired voltages on the buses 60, 61, 62, 63, and 64 by moving energy stored in the capacitors 1205, 1210, 1215, and 1220 onto the buses 64, 63, 61, and 60, as appropriate. The switches 1235, 1245, 1255, 1265, 1275, and 1285 are configured to be switched by the PWM controller 1315. The PWM controller 1315 is configured to control the switches to be first and second states. In the first state, the switches 1235, 1255, and 1275 are on while the switches 1245, 1265, and 1285 are off. In the second state the switches 1235, 1255, and 1265 are off while the switches 1245, 1265, and 1285 are on. Due to these switch states, voltages within the DC bus balancer 1200 alternate as shown in Table 1.

| Junction of | First State Voltage | Second State Voltage |
|---|---|---|
| Switches 1235 and 1245 | Voltage at node 1310 | Voltage at node 1311 |
| Switches 1255 and 1265 | Voltage at node 1311 | Voltage at node 1313 |
| Switches 1275 and 1285 | Voltage at node 1313 | Voltage at node 1314 |

Thus, when the nodes 1310, 1311, 1313, and 1314 provide 450 V, 150 V, −150 V, and −450 V, respectively, then each of the junctions described in Table 1 alternate by about 300 V (peak to peak). The remainder of the discussion of the DC bus balancer 1200 assumes that the buses 64, 63, 61, and 60 provide 450 V, 150 V, −150 V, and −450 V, respectively (relative to the neutral).

During balanced operation of the DC bus balancer 1200 (e.g., the voltages on the nodes 1310, 1311, 1312, 1313, and 1314 are at desired levels), the signal present at each of the junctions described in Table 1 will be substantially square. Further, during balanced operation, the voltage swings at the junctions described in Table 1 will be substantially in phase with each other and have substantially the same amplitude. The voltage differences across the resonant tanks 1320 and 1325 are preferably about equal to one-third of the total DC voltage between the bus 60 and 64 (e.g., 300 V). The capacitors 1225 and 1230 are configured to charge to the potential placed across the resonant tanks 1320 and 1325, respectively (e.g., 300 V).

The DC bus balancer 1200 is configured to compensate for unbalanced voltages on the nodes 1310, 1311, 1312, 1313, and 1314 using energy stored in the resonant tanks 1320 and 1325. During unbalanced operation of the DC bus balancer 1200, the amplitude of the square-wave voltages induced across the junctions described in Table 1 can be uneven, which can cause a square wave voltage to appear across one or more of the resonant tanks 1320 and 1325. Each of the resonant tanks 1320 and 1325 are configured such that, as a voltage appears across the resonant tanks 1320 and 1325, a current flows through each of the resonant tanks 1320 and 1325. The resonant tanks 1320 and 1325 are configured to have a low impedance (e.g., approaching zero) such that even a small voltage potential across each of the resonant tanks 1320 and/or 1325 can cause a large current flow through the resonant tanks 1320 and/or 1325. The impedance of the resonant tanks 1320 and 1325 can be a function of the frequency at which the switches 1235, 1245, 1255, 1265, 1275, and 1285 are switched at (or vice versa). For example, as the switching frequency approaches being equal to the resonant frequency of the resonant tanks 1320 and 1325, the impedance of the resonant tanks 1320 and 1325 approaches zero. The resonant tanks 1320 and 1325 are configured to cause a current to flow that can move energy from the capacitors 1205, 1210, 1215, and/or 1220 having voltage(s) higher than the preferred voltage levels of 300 V and 150 V, respectively, towards the capacitors having voltage(s) lower than the preferred voltage levels. The switches (e.g., of the switches 1235, 1245, 1255, 1265, 1275, and 1285) that are coupled across the capacitor (e.g., of the capacitors 1205, 1210, 1215, and/or 1220) having the higher voltage are configured to act as a generator and create an AC current through the resonant tanks 1320 and/or 1325 to establish a flow of real power towards the capacitor (e.g., of the capacitors 1205, 1210, 1215, and/or 1220) having the lowest voltage. The DC bus balancer 1200 is configured such that the current flow through the resonant tanks 1320 and 1325 preferably starts when the voltage difference between imbalanced capacitors exceeds a forward voltage drop of the respective diodes 1240, 1250, 1260, 1270, 1280, and 1290 (e.g., a few volts). Preferably, as the frequency that the switches 1235, 1245, 1255, 1265, 1275, and 1285 are switched at approaches the resonant frequency of the resonant tanks 1225 and 1230, zero-crossings of the induced current occur closer to the dead time between the first and second states, which can reduce switching losses.

Figure 14:
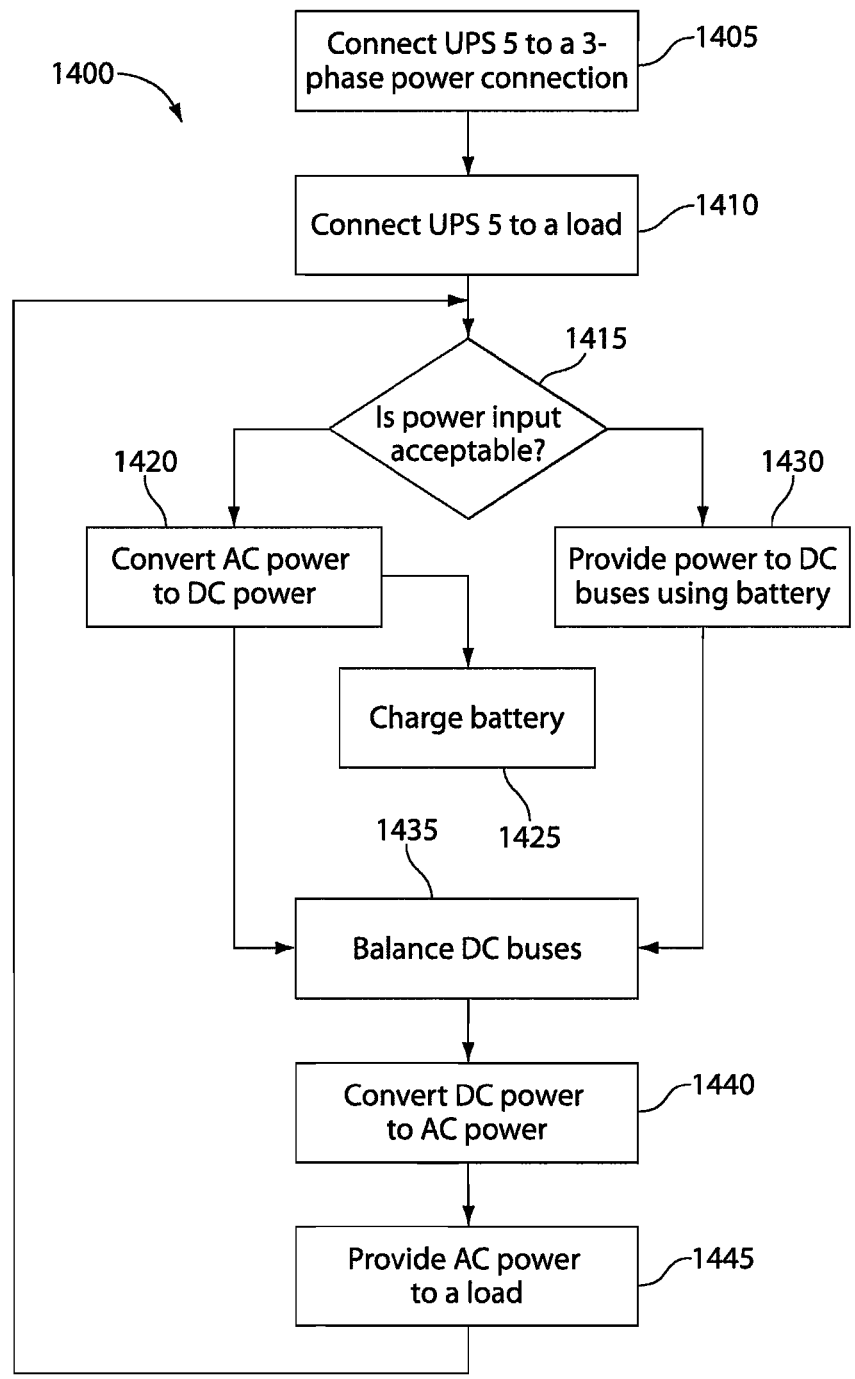
FIG. 14 is a flowchart of a process for providing power from the 3-phase UPS shown in FIG. 1.

In operation, referring to FIG. 14, with further reference to FIGS. 1-13, a process 1400 for providing an uninterruptible power to a load using the UPS 5 includes the stages shown. The process 1400, however, is exemplary only and not limiting. The process 1400 may be altered, e.g., by having stages added, removed, altered, or rearranged. Furthermore, while portions of the process 1400 are shown as successive steps, certain stages can occur in parallel (e.g., stages 1435 and 1440).

At stage 1405, the UPS 5 is coupled to a 3-phase power feed. The AC/AC modules 10, 20, and 30 are coupled to the X, Y, and Z-phases of the 3-phase power feed, respectively. The AC/AC modules 10, 20, and 30 are further coupled to a neutral connection of the 3-phase power feed. The power feed provides 3-phase AC power to the UPS 5.

At stage 1410, the UPS 5 is coupled to one or more loads. The UPS 5 can be coupled to a 3-phase load (e.g., the AC/AC module 10 provides the X-phase, AC/AC module 20 provides the Y-phase, and AC/AC module 30 provides the Z-phase). Alternatively, the UPS 5 can be coupled to one or more single-phase loads. For example, each of the AC/AC modules 10, 20, and 30 can provide single phase power to one or more loads.

At stage 1415, the UPS 5 determines whether the AC power feed is acceptable. If the UPS 5 determines that the AC input power is acceptable, then the process 1400 proceeds to stage 1420. If the UPS 5 determines that the input power is unacceptable, e.g., has stopped and/or become unstable (e.g., a low-voltage condition), then the process 1400 proceeds to stage 1430.

At stage 1420, the AC/DC modules 11, 21, and 31 convert the incoming AC power to DC power, which is provided to the buses 60, 61, 63, and 64. The AC/DC modules 11, 21, and 31 are initialized (e.g., the switches are switched to the state corresponding to a power signal being provided) upon startup, or upon suitable power being provided to the UPS 5. While the following discussion focuses on the AC/DC module 11, the operation of the AC/DC modules 21 and 31 can be similar. The AC/DC module 11 processes the input AC power using a combined low-pass filter and a boost converter (i.e., the combination of the capacitor 280 and the inductor 285). The PWM controller 275 switches the switches 210, 220, 230, 240, 250, and 260 as a function of the power signal being received by the AC/DC module 11. For example, the PWM controller 275 causes the switches 210, 220, 230, 240, 250, and 260 to operate in one of three states. In the first state, the PWM controller 275 toggles the switches 210 and 220 in a mutually exclusive manner, maintains the switches 230 and 250 in an on position, and maintains the switches 240 and 260 in an off position. In the second state, the PWM controller 275 maintains the switches 210 and 260 in an off position, maintains the switches 220 and 250 in an on position, and toggles the switches 230 and 240 is a mutually exclusive manner. In the third state, the PWM controller maintains the switches 210 and 230 in an off position, maintains the switches 220 and 240 in an on position, and toggles the switches 250 and 260 in a mutually exclusive manner. The PWM controller 275 causes the AC/DC converter 11 to operate in the first state when the AC input provided to the AC/DC module 11 is greater than one-third of the voltage provided at the output 265. The PWM controller 275 causes the AC/DC converter 11 to operate in the second state when the AC input provided to the AC/DC module 11 is between one-third of the voltage provided at the output 265 and one-third of the voltage provided at the output 268. The PWM controller 275 causes the AC/DC converter 11 to operate in the third state when the AC input provided to the AC/DC module 11 is below one-third of the voltage provided at the output 268.

At stage 1425, the DC/DC converter 1000 charges the battery 50. The DC/DC converter 1000 receives a first set of DC voltages from the buses 60, 61, 63, and 64. When the UPS 5 is receiving suitable power from the power feed, the DC/DC converter 1000 converts the first voltage set to a first DC voltage that is provided to the battery 50. The voltage provided to the battery 50 is between the voltage present on the bus 64 and one-third of the voltage provided on the bus 64.

The PWM controller 1115 causes the DC/DC converter 1000 to act as a Buck converter converting the first voltage set into the first voltage. The PWM controller 1115 causes the switches 1020 and 1030 to be maintained in an off position, while the switches 1010 and 1040 are substantially simultaneously switched on and off. Each time the switches 1010 and 1040 are switched on, the inductors 1080 and 1085 charge and the batteries 1095 and 1100 receive a voltage that is substantially equal to the first voltage. Each time the switches 1010 and 1040 are switched off, the inductors 1080 and 1085 discharge (e.g., current freewheels through the diodes 1015 and 1025) and provide substantially the first voltage to the batteries 1095 and 1100. Preferably, the switches 1010 and 1040 are switched to an on state prior to the inductors 1080 and 1085 completely discharging.

At stage 1430, the PWM controller 1115 causes the DC/DC converter 1000 to act as a boost converter converting the second voltage into the second voltage set. The PWM controller 1115 causes the switches 1020 and 1030 to substantially simultaneously switch on and off while the switches 1010 and 1040 are maintained in an off position. Each time the switches 1020 and 1030 are switched on, the inductors 1080 and 1085 charge using power from the batteries 1095 and 1100. Each time the switches 1020 and 1030 are switched off, the inductors 1080 and 1085 discharge and a current freewheels through the diodes 1005 and 1035 (e.g., caused by the energy stored in the batteries 1095 and 1100 and the inductors 1080 and 1085). Preferably, the switches 1020 and 1030 are switched to an on state prior to the inductors 1080 and 1085 completely discharging. The capacitors 1070 and 1075 can be used to reduce ripple current in the power provided to the nodes 1090, 1091, 1093, and 1094. Furthermore, the UPS switches are set to a state to receive DC power from the battery 50. For example, upon detecting that the AC power feed is unavailable and/or unstable, the connection 13 is decoupled from the buses 64, 63, 61, and 60 by configuring all switches in the AC/DC modules 11 to an off position. Likewise, the operation of the AC/DC converters 21 and 31 is similar.

At stage 1435, the DC bus balancer 1200 balances the voltages present on the buses 60, 61, 63, and 64. While the stage 1435 is shown as a stage placed between other stages, the DC bus balancer 1200 balances the voltages present on the buses 60, 61, 63, and 64 parallel with other stages during operation of the UPS 5. The DC bus balancer 1200 balances and maintains the desired voltages on the buses 60, 61, 62, 63, and 64 by moving energy stored in the capacitors 1205, 1210, 1215, and 1220 onto the buses 64, 63, 61, and 60, as appropriate. The switches 1235, 1245, 1255, 1265, 1275, and 1285 are switched by the PWM controller 1315. The PWM controller 1315 switches the switches 1235, 1245, 1255, 1265, 1275, and 1285 in first and second states. In the first state, the switches 1235, 1255, and 1275 are switched on while the switches 1245, 1265, and 1285 are set off. In the second state the switches 1235, 1255, and 1265 are set off while the switches 1245, 1265, and 1285 are set on. Voltages within the DC bus balancer 1200 alternate as shown in Table 1 (shown above). Thus, when the nodes 1310, 1311, 1313, and 1314 provide 450 V, 150 V, −150 V, and −450 V, respectively, each of the junctions described in Table 1 alternate by about 300 V (peak to peak). The remainder of the discussion of the DC bus balancer stage 1435 assumes that the buses 64, 63, 61, and 60 provide 450 V, 150 V, −150 V, and −450 V, respectively (relative to the neutral).

During balanced operation of the DC bus balancer 1200 (e.g., the voltages on the nodes 1310, 1311, 1312, 1313, and 1314 are at desired levels), the signal present at each of the junctions described in Table 1 will be substantially square. Thus, during balanced operation, the voltage swings at the junctions described in Table 1 will be substantially in phase and have substantially the same amplitude. The voltage differences across the resonant tanks 1320 and 1325 are about equal to one-third of the total DC voltage between the bus 60 and the bus 64 (e.g., 300 V). The capacitors 1225 and 1230 charge to the potential placed across the resonant tanks 1320 and 1325, respectively (e.g., 300 V).

The DC bus balancer 1200 compensates for unbalanced voltages on the nodes 1310, 1311, 1312, 1313, and 1314 using energy stored in the resonant tanks 1320 and 1325. During unbalanced operation of the DC bus balancer 1200, the amplitude of the square-wave voltages induced across the junctions described in Table 1 can be uneven, which can cause a square wave voltage to appear across one or more of the resonant tanks 1320 and 1325. As a voltage appears across each of the resonant tanks 1320 and/or 1325, current flows through each of the resonant tanks 1320 and/or 1325, respectively. The amount of current flowing in the resonant tanks 1320 and/or 1325 can be increased by reducing the impedance of the resonant tanks 1320 and 1325 (e.g., an impedance approaching zero). The PWM controller 1315 switches the switches 1235, 1245, 1255, 1265, 1275, and 1285 at a frequency such that the impedance of the resonant tanks 1320 and 1325 is reduced. For example, as the switching frequency approaches being equal to the resonant frequency of the resonant tanks 1320 and 1325, the impedance of the resonant tanks 1320 and 1325 approaches zero. When there is a voltage present across the resonant tanks 1320 and 1325 a current flows from the capacitor having the higher voltage (e.g., of the capacitors 1205, 1210, 1215, and 1220) towards the capacitor having the lower voltage (e.g., of the capacitors 1205, 1210, 1215, and 1220). The switches (e.g., of the switches 1235, 1245, 1255, 1265, 1275, and 1285) that are coupled across the capacitor having the higher voltage (e.g., of the capacitors 1205, 1210, 1215, and 1220) act as a generator and create an AC current through the resonant tanks 1320 and/or 1325 to establish a flow of real power towards the capacitor (e.g., of the capacitors 1205, 1210, 1215, and 1220) having the lowest voltage. The current flow through the resonant tanks 1320 and 1325 preferably starts when the voltage difference between the imbalanced capacitors exceeds a forward voltage drop of the respective diodes 1240, 1250, 1260, 1270, 1280, and 1290 (e.g., a few volts).

A waveform of induced current flowing in the resonant tanks 1225 and 1230 (e.g., caused by unbalanced operation of the DC bus balancer 1200) is similar to a sine wave. Preferably, as the frequency that the switches 1235, 1245, 1255, 1265, 1275, and 1285 are switched at approaches the resonant frequency of the resonant tanks 1225 and 1230, zero-crossings of the induced current occur closer to the dead time between the first and second states, which can reduce switching losses.

At stage 1440, DC power on the buses 60, 61, 63, and 64 is converted to AC power by the DC/AC converters 12, 22, and 32. Each of the DC/AC converters 12, 22, and 32 is preferably configured as the DC/AC converter 700. The DC/AC converter 700 receives power from the AC/DC converter 200, or the battery 50 via the buses 60, 61, 63, and 64. The DC/AC converter 700 generates an AC output having peak voltages about equal to the voltages present on the input 765 and the input 768. A phase of each of the DC/AC converters 12, 22, and 32 are preferably varied such that standard 3-phase power can be provided to a load.

Referring also to FIGS. 9-10, the DC/AC converter 700 converts the DC power to AC power by switching the switches 710, 720, 730, 740, 750, and 760 in a predetermined sequence. The PWM controller 775 switches the switches 710, 720, 730, 740, 750, and 760 in different sequences depending on the desired output at the output 702. When the desired output (at the output 702) is between the voltages present at the inputs 765 and 766, the PWM controller 775 actively switches the switches 710 and 720 on and off, sets to the switches 730 and 750 to an on position, and sets the switches 740 and 760 to an off position. When the desired output (at the output 702) is between the voltages present at the inputs 766 and 767 the PWM controller 775 actively switches the switches 730 and 740 on and off, sets the switches 720 and 750 to an on position, and sets the switches 710 and 760 to an off position. When the desired output (at the output 702) is between the voltages present at the inputs 767 and 768, the PWM controller 775 actively switches the switches 750 and 760 on and off, sets the switches 720 and 540 to an on position, and sets the switches 710 and 730 to an off position. In each of the three states, the duty cycle of the switches 710, 720, 730, 740, 750, and 760 that are being actively switched are varied such that the output of the filter 770 is substantially AC (e.g., as shown in FIGS. 9-10). The filter 770 (e.g., an LC low-pass filter) filters the signal provided at the node 780 into a substantially AC signal which is provided to the output 702.

At stage 1445 AC power is provided to a load. The configuration of the power that is provided to the load can vary depending on the desired operation. For example, each of the DC/AC converters 12, 22, and 32 can provide one phase of a 3-phase power connection, all or a portion of the DC/AC converters 12, 22, and 32 can provide power having a single phase, each of the DC/AC converters 12, 22, and 32 can provide single phase power to individual loads, etc.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. While three DC/AC converters are shown (e.g., DC/AC converters 12, 22, 32, and 42) a single DC/AC converter can be used if only single phase power is desired. The AC/DC and DC/AC converters can be split into multiple parallel circuits and be switched in an interleaved manner, e.g., to reduce ripple current on the buses. The voltages present on the buses 61, 62, 64, and 65 can be different from that described herein. A battery can be coupled directly to the buses 61, 63, and/or 64, without the use of a DC/DC converter. DC bus symmetry can be controlled by a modified control scheme of the AC/DC converter.

Referring to FIG. 1, while the UPS 5 is shown as including the DC/DC module 40, the DC/DC module 40 can be omitted. For example, a UPS can convert a 3-phase power feed from the first voltage to the second voltage without the presence of the DC/DC module 40.

While the description herein describes numerous separate capacitors, two or more capacitors can be combined into a single capacitor. For example, FIG. 10 shows the capacitor 905 coupled between the bus 64 and the bus 63, FIG. 11 shows the capacitor 1050 coupled between the bus 64 and the bus 63, and FIG. 12 shows the capacitor 1205 coupled between the bus 64 and the bus 63. The capacitors 905, 1050, and 1205 can be a single shared capacitor.

Referring to FIG. 2, while the AC/DC converter 200 is configured as a four-quadrant inverter providing both positive and negative DC voltages, an AC/DC converter can be arranged in other configurations. For example, an AC/DC converter can be configured as a 2-quadrant rectifier providing only positive DC voltages during the positive half-cycles of the input line voltage (and only negative DC voltages during the negative half-cycles of the input line voltage) by replacing switches 210 and 260 with diodes.

While the present disclosure uses co-packed devices (e.g., a switch and a diode coupled in parallel) other circuits can be used. For example, a circuit configured to allow a current to flow in a first direction substantially uninhibited, while selectively controlling current flow in a direction opposite from the first direction, can be used.

Further, while the description above refers to the invention, the description may include more than one invention.

What is claimed is:

1. An uninterruptible power supply (UPS) comprising:
   a plurality of electrical buses;
   a first AC/DC converter coupled to the electrical buses and configured to receive a first input AC voltage and to convert the first input AC voltage to a plurality of DC voltages, the first AC/DC converter being configured to convey the plurality of DC voltages to the plurality of electrical buses;
   a second AC/DC converter coupled to the electrical buses and configured to receive a second input AC voltage and to convert the second input AC voltage to the plurality of DC voltages, the second AC/DC converter being configured to convey the plurality of DC voltages to the plurality of electrical buses;
   a third AC/DC converter coupled to the electrical buses and configured to receive a third input AC voltage and to convert the third input AC voltage to the plurality of DC voltages, the third AC/DC converter being configured to convey the plurality of DC voltages to the plurality of electrical buses;
   a first DC/AC converter coupled to the plurality of electrical buses and configured to receive the plurality of DC voltages and to convert the plurality of DC voltages into a first output AC voltage; and
   a DC bus balancer configured to maintain voltages present on the electrical buses at desired levels, the DC bus balancer being configured to transfer energy between the plurality of electrical buses.

2. The UPS of claim 1 further comprising:
   a second DC/AC converter coupled to the plurality of electrical buses and configured to receive the plurality of DC voltages and to convert the plurality of DC voltages into a second output AC voltage; and
   a third DC/AC converter coupled to the plurality of electrical buses and configured to receive the plurality of DC voltages and to convert the plurality of DC voltages into a third output AC voltage.

3. The UPS of claim 2 wherein the first, second, and third DC/AC converters are configured to convey 3-phase power to a load.

4. The UPS of claim 1 further comprising:
   a DC/DC converter coupled to the plurality of electrical buses and configured to:
   convert the plurality of DC voltages to a battery DC voltage; and
   convert the battery DC voltage to the plurality of DC voltages.

5. The UPS of claim 4 wherein:
   the DC/DC converter is configured to convert the plurality of DC voltages to the battery DC voltage when the first, second, and third input AC voltages are within a predetermined range; and
   the DC/DC converter is configured to convert the battery DC voltage to the plurality of DC voltages when the first, second, and third input AC voltages are not within the predetermined range.

6. The UPS of claim 4 wherein a battery is coupled to the DC/DC converter and is configured to:
   receive and be charged by the battery DC voltage; and
   convey the battery DC voltage to the DC/DC converter.

7. The UPS of claim 4 wherein:
   the first, second, and third AC/DC converters are configured such that the first, second, and third AC/DC converters convey the plurality of DC voltages to the plurality of electrical buses when the first, second, and third input AC voltages are within a predetermined threshold; and
   the DC/DC converter is configured such that the DC/DC converter conveys the plurality of DC voltages to the plurality of the electrical buses when the first, second, and third input AC voltages are not within the predetermined threshold.

8. The UPS of claim 1 wherein the first AC/DC converter is configured to be coupled to a first phase of a 3-phase power source;
   the second AC/DC converter is configured to be coupled to a second phase of a 3-phase power source; and
   the third AC/DC converter is configured to be coupled to a third phase of a 3-phase power source.

9. The UPS of claim 1 wherein:
   the DC bus balancer includes a plurality of storage devices separate from the electrical buses; and
   the DC bus balancer is further configured to transfer energy from the plurality of storage devices to the plurality of electrical buses.

10. The UPS of claim 1 wherein the plurality of DC voltages includes a first output DC voltage, a second output DC voltage, a third output DC voltage and a fourth output DC voltage and wherein:
    the first output DC voltage is equal to or greater than a positive peak input voltage of the first input AC voltage multiplied by $$\frac{\sqrt{2}}{\sqrt{3}};$$

the second output DC voltage is substantially equal to one-third of the first output DC voltage;

the third output DC voltage is substantially equal to one-third of the fourth output DC voltage; and the fourth output DC voltage is equal to or less than a negative peak input voltage of the first input AC voltage multiplied by $$\frac{\sqrt{2}}{\sqrt{3}}.$$

11. A method for providing uninterruptible power to a load, the method comprising:

receiving a first, second and third input AC voltage;

converting, with a first AC/DC converter, the first input AC voltage into a plurality of DC voltages;

converting, with a second AC/DC converter, the second input AC voltage into the plurality of DC voltages;

converting, with a third AC/DC converter, the third input AC voltage into the plurality of DC voltages;

providing, with the first, second and third AC/DC converters, the plurality of DC voltages to a plurality of electrical buses;

converting, with a first DC/AC converter, the plurality of DC voltages from the plurality of electrical buses into a first output AC voltage; and transferring energy, with a DC bus balancer, between the plurality of electrical buses to maintain voltages present on the plurality of electrical buses at desired levels.

12. The method of claim 11 further comprising:

converting, with a DC/DC converter, the plurality of DC voltages into a battery DC voltage;

converting, with the DC/DC converter, the battery DC voltage into the plurality of DC voltages; and providing, with the DC/DC converter, the plurality of DC voltages to the plurality of electrical buses.

13. The method of claim 12 wherein:

providing, with the first, second and third AC/DC converters, the plurality of DC voltages to the plurality of electrical buses includes providing the plurality of DC voltages to the plurality of electrical buses when the first, second, and third input AC voltages are within a predetermined threshold; and providing, with the DC/DC converter, the plurality of DC voltages to the plurality of electrical buses includes providing the plurality of DC voltages to the plurality of the electrical buses when the first, second, and third input AC voltages are not within the predetermined threshold.

14. The method of claim 12 wherein:

converting the plurality of DC voltages into a battery DC voltage includes converting the plurality of DC voltages to the battery DC voltage when the first, second, and third input AC voltages are within a predetermined range; and converting the battery DC voltage into the plurality of DC voltages includes converting the battery DC voltage into the plurality of DC voltages when the first, second, and third input AC voltages are not within the predetermined range.

15. The method of claim 12 further comprising:

charging a battery with the battery DC voltage; and providing the battery DC voltage to the DC/DC converter.

16. The method of claim 11 wherein transferring energy between the plurality of electrical buses includes transferring energy from a plurality of storage devices within the DC bus balancer to the plurality of electrical buses, the plurality of storage devices separate from the plurality of electrical buses.

17. The method of claim 11 further comprising:

converting, with a second DC/AC converter, the plurality of DC voltages from the plurality of electrical buses into a second output AC voltage;

converting, with a third DC/AC converter, the plurality of DC voltages from the plurality of electrical buses into a third output AC voltage; and providing the first, second and third output AC voltages to the load.

18. The method of claim 17 wherein providing the first, second and third output AC voltages to the load includes providing 3-phase power to the load.

19. The UPS of claim 18 wherein receiving a first, second and third input AC voltage includes:

receiving, with the first AC/DC converter, a first phase of a 3-phase power source;

receiving, with the second AC/DC converter, a second phase of the 3-phase power source; and receiving, with the third AC/DC converter, a third phase of the 3-phase power source.

20. An uninterruptible power supply (UPS) comprising:

a plurality of electrical buses;

a first AC/DC converter coupled to the electrical buses and configured to receive a first input AC voltage and to convert the first input AC voltage to a plurality of DC voltages, the first AC/DC converter being configured to convey the plurality of DC voltages to the plurality of electrical buses;

a second AC/DC converter coupled to the electrical buses and configured to receive a second input AC voltage and to convert the second input AC voltage to the plurality of DC voltages, the second AC/DC converter being configured to convey the plurality of DC voltages to the plurality of electrical buses;

a third AC/DC converter coupled to the electrical buses and configured to receive a third input AC voltage and to convert the third input AC voltage to the plurality of DC voltages, the third AC/DC converter being configured to convey the plurality of DC voltages to the plurality of electrical buses;

a first DC/AC converter coupled to the plurality of electrical buses and configured to receive the plurality of DC voltages and to convert the plurality of DC voltages into a first output AC voltage; and means for transferring energy between the plurality of electrical buses to maintain voltages present on the electrical buses at desired levels.

* * * * *

UNITED STATES PATENT AND TRADEMARK OFFICE
CERTIFICATE OF CORRECTION

PATENT NO. : 8,664,796 B2  
APPLICATION NO. : 13/616482  
DATED : March 4, 2014  
INVENTOR(S) : Henning Roar Nielsen Page 1 of 1

It is certified that error appears in the above-identified patent and that said Letters Patent is hereby corrected as shown below:

On the Title Page of the Patent, item (73):

Assignee: "Schneider Electric II Corporation" should be --Schneider Electric IT Corporation--

Signed and Sealed this  
First Day of July, 2014

Michelle K. Lee  
*Deputy Director of the United States Patent and Trademark Office*